US009547827B2

(12) United States Patent
Ide et al.

(10) Patent No.: US 9,547,827 B2
(45) Date of Patent: Jan. 17, 2017

(54) TERMINAL DEVICE, TERMINAL CONTROL METHOD, PROGRAM AND INFORMATION PROCESSING SYSTEM

(71) Applicant: Sony Corporation, Tokyo (JP)

(72) Inventors: Naoki Ide, Tokyo (JP); Takashi Usui, Tokyo (JP); Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 13/777,653

(22) Filed: Feb. 26, 2013

(65) Prior Publication Data
US 2013/0262354 A1 Oct. 3, 2013

(30) Foreign Application Priority Data
Mar. 30, 2012 (JP) .................. 2012-079034

(51) Int. Cl.
G06N 99/00 (2010.01)
(52) U.S. Cl.
CPC .................. G06N 99/005 (2013.01)
(58) Field of Classification Search
None
See application file for complete search history.

(56) References Cited

U.S. PATENT DOCUMENTS

2005/0075905 A1* 4/2005 Bennett et al. ............... 705/2
2007/0100650 A1* 5/2007 Ramer et al. ................. 705/1
2011/0016479 A1* 1/2011 Tidwell et al. ............... 725/9
2012/0009890 A1* 1/2012 Curcio et al. .............. 455/230
2012/0041819 A1* 2/2012 Ramer et al. ............. 705/14.46
2012/0087260 A1* 4/2012 Devarapalli et al. ........ 370/252
2012/0087368 A1* 4/2012 Kunarathnam et al. ..... 370/389
2012/0106346 A1* 5/2012 Aguirre et al. .............. 370/237

(Continued)

FOREIGN PATENT DOCUMENTS

JP 2010-211425 A 9/2010
JP 2011-010267 A 1/2011
JP 2012-009987 A 1/2012

OTHER PUBLICATIONS

Ando et al,"Performance of Pheromone Model for Predicting Traffic Congestion", AAMAS'06, May 8-12, 2006, Hakodate, Hokkaido, Japan.*

(Continued)

Primary Examiner — Stanley K Hill
Assistant Examiner — Ilya Traktovenko
(74) Attorney, Agent, or Firm — Wolf, Greenfield & Sacks, P.C.

(57) ABSTRACT

A terminal device includes an acquisition unit, an accumulation unit, a communication unit and a prediction unit. The acquisition unit acquires local information of a present location at a present time. The accumulation unit accumulates the acquired local information for a period of time. The communication unit transmits, to an information processing device, the accumulated local information. The communication unit also receives, from the information processing device, parameters of a statistical model which are learned using local information acquired from a plurality of other terminal devices. The prediction unit predicts local information in relation to an arbitrary time and location using the received parameters of the statistical model.

8 Claims, 30 Drawing Sheets

(56) References Cited

U.S. PATENT DOCUMENTS

| 2012/0106571 | A1* | 5/2012 | Jeon et al. ..................... | 370/465 |
| 2012/0140633 | A1* | 6/2012 | Stanwood et al. ............ | 370/235 |
| 2012/0170503 | A1* | 7/2012 | Kelley et al. ................. | 370/312 |
| 2012/0198020 | A1* | 8/2012 | Parker et al. ................. | 709/217 |
| 2013/0046879 | A1* | 2/2013 | Garcia et al. ................ | 709/224 |
| 2013/0130642 | A1* | 5/2013 | Joul et al. .................... | 455/406 |

OTHER PUBLICATIONS

Paul et al, "Communication-aware mobile hosts in ad-hoc wireless network", Published in: Personal Wireless Communication, 1999 IEEE International Conference on Date of Conference: 1999, pp. 83-87.*

Rajagopal et al, "GPS Based Predictive Resource Allocation in Cellular Networks", Published in: Networks, 2002, ICON 2002, 10th IEEE International Conference on Date of Conference: 2002, pp. 229-234.*

Tran et al, "Congestion Adaptive Routing in Mobile Ad Hoc Networks", IEEE Transactions on Parallel and Distributed Systems, vol. 17, No. 11, Nov. 2006,published online Sep. 26, 2006.*

* cited by examiner

FIG. 3

| DATE | TIME | BASE STATION ID | CONGESTION FACTOR |
|---|---|---|---|
| 02-01-2012 | 10'54"00 | 25134 | 0.75 |
| ... | 10'55"00 | 25134 | 0.63 |
| ... | 10'56"00 | 25132 | 0.21 |
| ... | 10'57"00 | 25132 | 0.25 |
| ... | 10'58"00 | 25100 | 0.13 |
| ... | 10'59"00 | 25100 | 0.12 |

FIG. 10

| SERIAL NUMBER n (n = 1, ..., N) | MULTIPLIER $a_n$ | MULTIPLIER $\tilde{a_n}$ | EXPLANATORY VARIABLE $x_{n, 1:D}$ | CRITERION VARIABLE $t_n$ |
|---|---|---|---|---|
| 1 | 0 | 0 | $x_{1, 1:D}$ | $t_1$ |
| 2 | 0.1 | 0 | $x_{2, 1:D}$ | $t_2$ |
| 3 | 0 | 0.1 | $x_{3, 1:D}$ | $t_3$ |
| 4 | 0.2 | 0 | $x_{4, 1:D}$ | $t_4$ |
| 5 | 0 | 0 | $x_{5, 1:D}$ | $t_5$ |
| ... | ... | ... | ... | ... |

| SERIAL NUMBER n | WEIGHTING AVERAGE $m_n$ | WEIGHTING DISTRIBUTION $\Sigma_n$ | EXPLANATORY VARIABLE $x_{n,\,1:D}$ | CRITERION VARIABLE $t_n$ |
|---|---|---|---|---|
| 1 | 0 | 0 | $x_{1,\,1:D}$ | $t_1$ |
| 2 | 0.1 | 1.0 | $x_{2,\,1:D}$ | $t_2$ |
| 3 | 0 | 0.0 | $x_{3,\,1:D}$ | $t_3$ |
| 4 | 0.2 | 1.1 | $x_{4,\,1:D}$ | $t_4$ |
| 5 | 0 | 0 | $x_{5,\,1:D}$ | $t_5$ |
| ... | ... | ... | ... | ... |

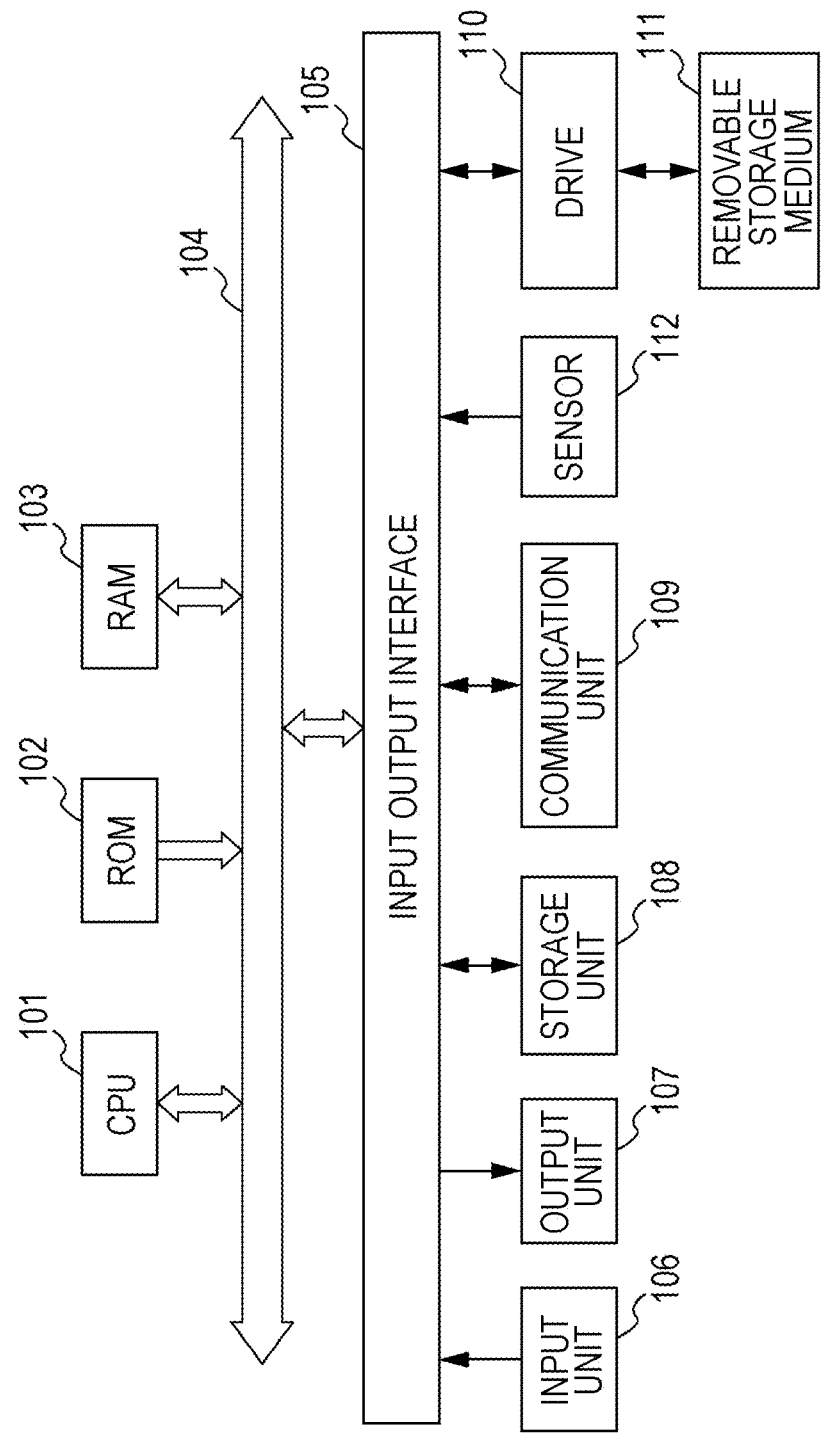

TERMINAL DEVICE, TERMINAL CONTROL METHOD, PROGRAM AND INFORMATION PROCESSING SYSTEM

BACKGROUND

The present technology relates to a terminal device, a terminal control method, a program and an information processing system. In particular, the present technology relates to a terminal device, a terminal control method, a program and an information processing system which make it possible for each terminal device to efficiently use data which is collected by a large number of terminal devices.

In recent years, the congestion factor of communications lines brought about by the rapid adoption of portable wireless communication terminals, such as smart phones, capable of communicating data of a large capacity has become a problem.

The present applicant proposes a method of estimating the congestion factor of a line by using an index b/a using a correlated output a of the received signal in relation to the scrambling code of the base station and a minimum value b of the correlated output in relation to another scrambling code (for example, refer to Japanese Unexamined Patent Application Publication No. 2011-10267, paragraph [0110], and Japanese Unexamined Patent Application Publication No. 2012-9987, paragraphs [0062], [0073], and [0077]). In addition, the present applicant proposes the estimation of the communication rate from the line congestion factor (for example, refer to Japanese Unexamined Patent Application Publication No. 2012-9987, paragraphs [0062], [0073], and [0077]).

Furthermore, the present applicant proposes a technique of predicting the destination and the movement route from the present location of the user to the destination and selecting the time, the place, the communications system, the transmission rate, and the like to perform communication (for example, refer to Japanese Unexamined Patent Application Publication No. 2010-211425, paragraphs [0121] to [0130]).

SUMMARY

However, in the technology of Japanese Unexamined Patent Application Publication No. 2010-211425, paragraphs [0121], [0130], it is disclosed that the communication information relating to the communication environment in the destination and movement route collected by a server from a large number of client terminals (terminal devices) is used, however it is not clear as to how the communication information is to be used. When all the communication information collected by a large number of client terminals are acquired, the communications line becomes congested and the storage capacity asked for client terminals increases.

In consideration of situations such as this, the present technology makes it possible for each terminal device to efficiently use data which is collected by a large number of terminal devices.

A terminal device according to a first embodiment of the present technology includes an acquisition unit which acquires local information of a present location at a present time; an accumulation unit which accumulates the acquired local information for a predetermined period; a communication unit which transmits the local information which is accumulated for a predetermined period to an information processing device, and receives parameters of a statistical model which are learned using the local information, which is acquired using the information processing device from a plurality of terminal devices, from the information processing device; and a prediction unit which predicts the local information in relation to an arbitrary time and location using the received parameters of the statistical model.

A terminal control method according to a first embodiment of the present technology includes causing a terminal device to acquire local information of a present location at a present time; causing a terminal device to accumulate the acquired local information for a predetermined period; causing a terminal device to transmit the local information which is accumulated for a predetermined period to an information processing device, and to receive parameters of a statistical model which are learned using the local information, which is acquired using the information processing device from a plurality of terminal devices, from the information processing device; and causing a terminal device to predict the local information in relation to an arbitrary time and location using the received parameters of the regression model.

A program according to a first embodiment of the present technology causes a computer to function as an acquisition unit which acquires local information of a present location at a present time; an accumulation unit which accumulates the acquired local information for a predetermined period; a communication unit which transmits the local information which is accumulated for a predetermined period to an information processing device, and receives parameters of a statistical model which are learned using the local information, which is acquired using the information processing device from a plurality of terminal devices, from the information processing device; and a prediction unit which predicts the local information in relation to an arbitrary time and location using the received parameters of the regression model.

According to the first embodiments of the present technology, local information of a present location at a present time is acquired; the acquired local information for a predetermined period is accumulated; the local information which is accumulated for a predetermined period is transmitted to an information processing device, and parameters of a statistical model which are learned using the local information, which is acquired using the information processing device from a plurality of portable terminals, are received from the information processing device; and the local information in relation to an arbitrary time and location is predicted using the received parameters of the regression model.

An information processing system according to a second embodiment of the present technology is formed from a terminal device and an information processing device in which the terminal device includes an acquisition unit which acquires local information of a present location at a present time; an accumulation unit which accumulates the acquired local information for a predetermined period; and a communication unit which transmits the local information which is accumulated for a predetermined period to the information processing device, and receives parameters of a statistical model which are learned using the local information which is acquired using the information processing device from a plurality of terminal devices, from the information processing device; and in which the information processing device includes a communication unit which receives the local information for a predetermined period transmitted thereto from the terminal device, and transmits the parameters of the statistical model to the terminal device; and a learning unit which learns the parameters of the statistical model using the local information received from a plurality of terminal devices; and in which either one of the terminal device or the information processing device includes a prediction unit which predicts the local information in relation to an arbitrary time and location using the parameters of the received statistical model.

According to the second embodiments of the present technology, in the terminal device, local information of a present location at a present time is acquired; the acquired local information for a predetermined period is accumulated; and the local information which is accumulated for a predetermined period is transmitted to the information processing device, and parameters of a statistical model which are learned using the local information which is acquired using the information processing device from a plurality of terminal devices, received from the information processing device; and in the information processing device, the local information of a predetermined period transmitted thereto from the terminal device is received, and the parameters of the statistical model are transmitted to the terminal device; and the parameters of the statistical model are learned using the local information received from a plurality of terminal devices; and in either one of the terminal device or the information processing device, the local information in relation to an arbitrary time and location is predicted using the parameters of the statistical model.

Furthermore, it is possible to provide the program by transmitting the program via a transmission medium, or by recording the program onto a recording medium.

The terminal device and the information processing device may be independent devices, and may also be internal blocks which configure a single device.

According to the first embodiments of the present technology, it is possible for each terminal device to efficiently use data which is collected by a large number of terminal devices.

According to the second embodiments of the present technology, it is possible to make each terminal device efficiently use data which is collected by a large number of terminal devices.

BRIEF DESCRIPTION OF THE DRAWINGS

FIG. 3 is a view showing an example of congestion factor data;

FIG. 10 is a view showing an example of the parameters $a_n$ and $a_n\sim$ of the support vector regression model;

FIG. 31 is a block diagram showing a configuration example of an embodiment of a computer to which the present technology has been applied.

DETAILED DESCRIPTION OF EMBODIMENTS

Embodiment of Information Processing System

Configuration Example of Information Processing System

Figure 1:
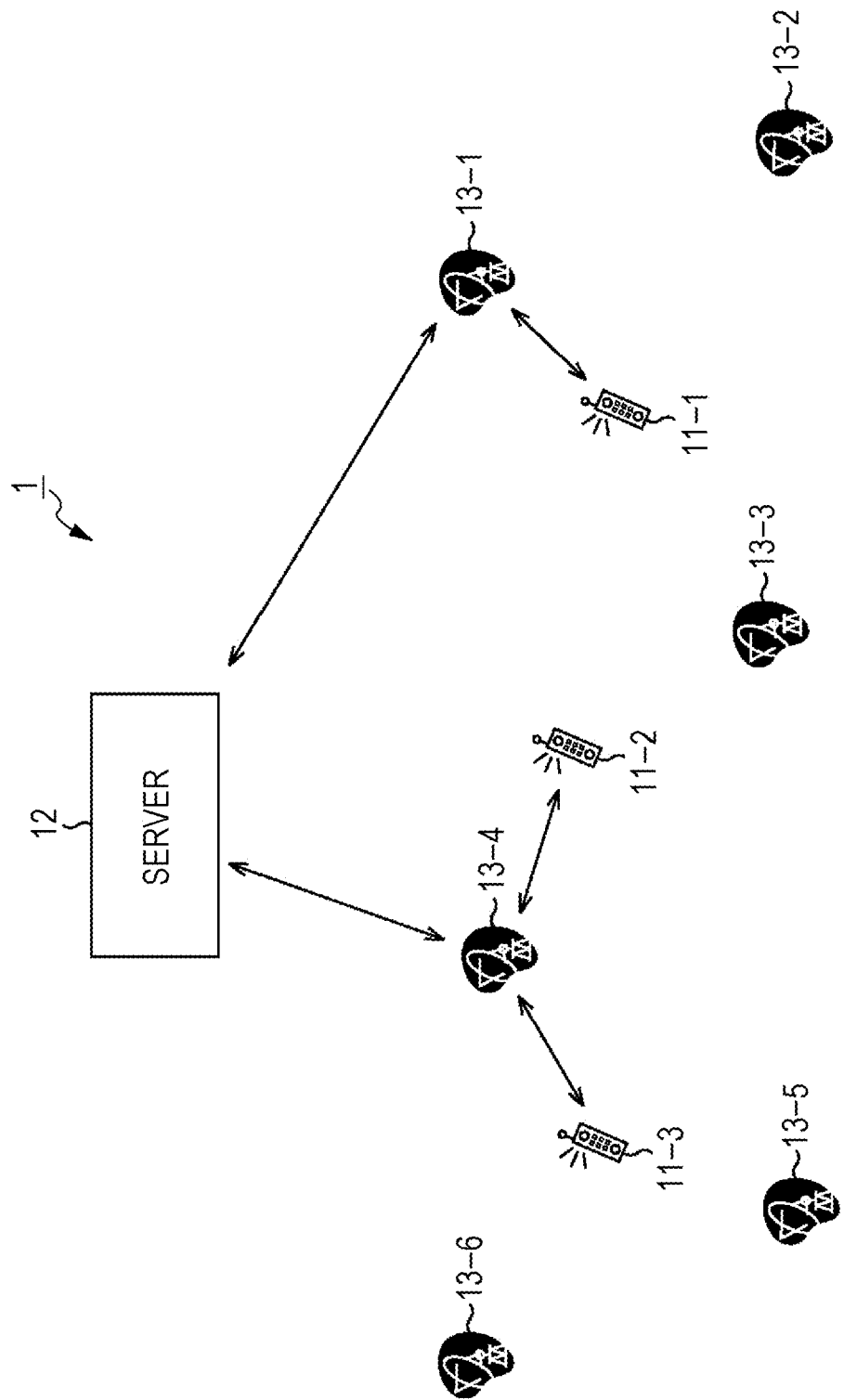
FIG. 1 is a view showing a configuration example of an embodiment of the information processing system to which the present technology has been applied.

FIG. 1 shows a configuration example of an embodiment of the information processing system to which the present technology has been applied.

The information processing system 1 of FIG. 1 includes a plurality of portable terminals (terminal devices) 11, a server 12 which collects and analyses the predetermined data acquired by the portable terminals 11, and a base station 13 to which the portable terminals 11 connect when performing data communication with the server 12.

Furthermore, in FIG. 1, three portable terminals 11-1 to 11-3 and six base stations 13-1 to 13-6 are shown, however the number of the portable terminals 11 and the base stations 13 is not limited thereto.

The portable terminals 11 determine that, among the plurality of base stations 13 which were detected as base stations 13 to which may be connected from the present location of the user, for example, the closest base station 13 is the base station 13 to connect to (hereinafter, referred to as a host cell 13). Furthermore, it is arbitrary as to how the host cell 13 is determined.

In addition, the portable terminals 11 transmit and receive predetermined data with the server 12 via the host cell 13. In the present embodiment, the portable terminals 11 measure the congestion factor of the communications line of the host cell 13 at a predetermined interval, accumulate the measurements as items of congestion factor data, and transmit the accumulated items of congestion factor data to the server 12. Furthermore, the portable terminals 11 receive the parameters which were obtained by learning based on the items of congestion factor data that the server 12 collected from the large number of portable terminals 11 from the server 12. Furthermore, here, the congestion factor of the line refers to an index showing the degree of occupancy of the communication bandwidth in multiplexed wireless communication.

The portable terminals 11 estimate the congestion factor of a predetermined base station 13 other than the host cell 13 using the parameters received from the server 12. The estimation results obtained by estimating the congestion factor of the base station 13 may be used to determine the base stations 13 to connect to at the present time and onward. For example, the portable terminals 11 predict the movement route and the destination of the user and determine the base station 13 to connect to using the movement route and the destination after estimating the congestion factor based on the received parameters.

In the present embodiment, the portable terminal 11 is a portable telephone such as a smart phone. The portable terminal 11 may be, for example, a tablet terminal, a portable PC (Personal Computer), a portable audio player, or the like. When the portable terminal 11 may not connect to the base stations 13 of the portable phone communications network, the base station 13 may also be an access point of wireless communication such as Wi-Fi.

The server 12 learns (models using a statistical model) the congestion factor of the base station 13 collected from the plurality of portable terminals 11 using a regression model. In the present embodiment, as the regression model, a kernel regression model, in particular, a support vector regression model or a relational vector regression model as described below is adopted.

Furthermore, the server 12 transmits the parameters (model parameters) of the regression model obtained through learning to the portable terminals 11. The portable terminals 11, for example, accumulate one day of time series data items of the congestion factor which is acquired at one minute intervals (congestion factor data), connect to the server 12 and transmit the data to the server 12 once per day. The server 12 executes the learning based on the collected congestion factor data, and when the next portable terminal 11 connects and transmits the congestion data, the server 12 transmits the updated model parameters of the learning model to the portable terminal 11. When the portable terminal 11 transmits the accumulated congestion factor data to the server 12, or in the interval during which the updated model parameters are received from the server 12, the timing at which the server 12 updates the model parameters of the regression model is arbitrary.

Functional Configuration Examples of Portable Terminal and Server

Figure 2:
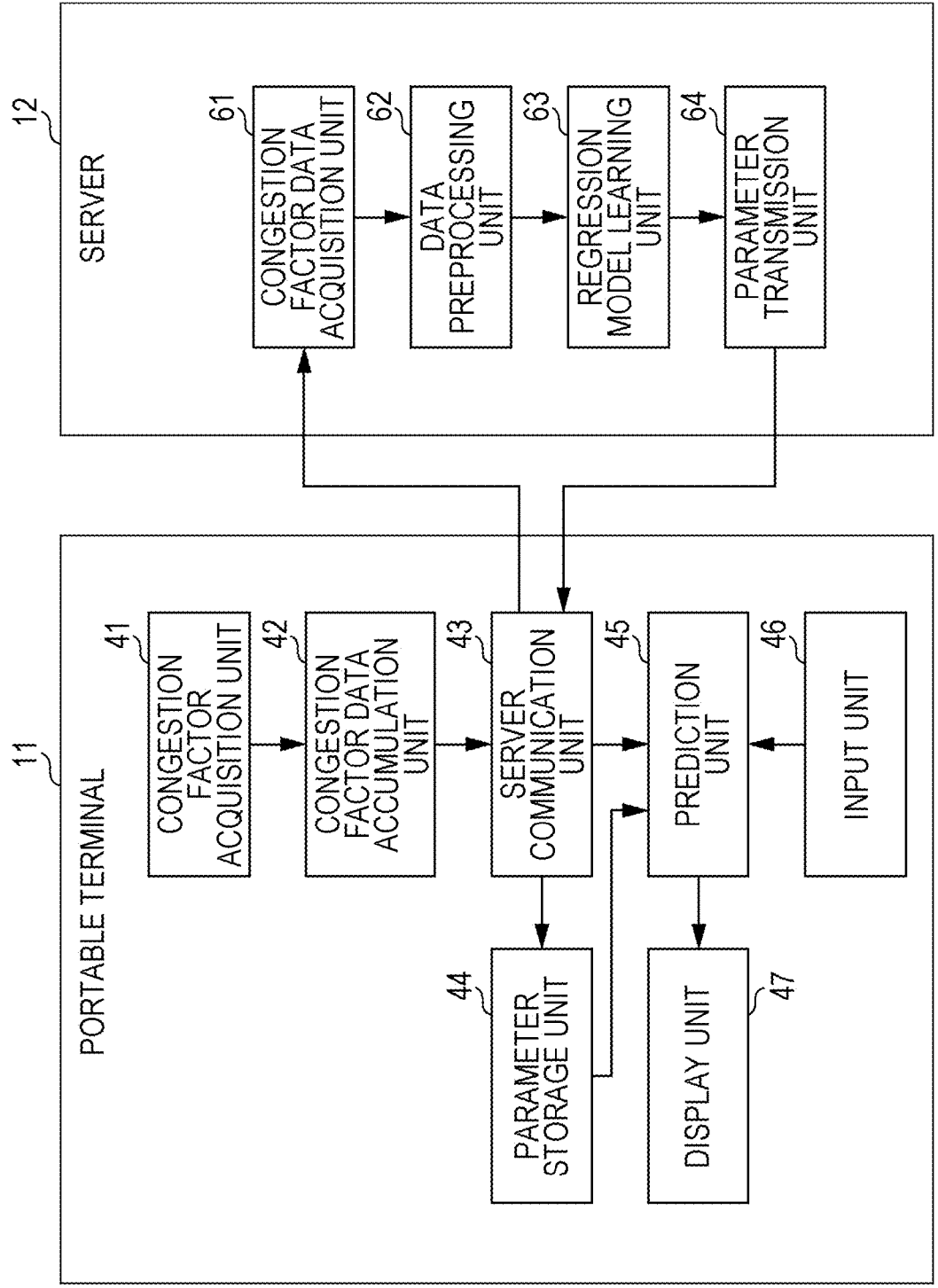
FIG. 2 is a block diagram showing a functional configuration example of a portable terminal and a server.

FIG. 2 is a block diagram showing a functional configuration example of the portable terminal 11 and the server 12.

The portable terminal 11 includes a congestion factor acquisition unit 41, a congestion factor data accumulation unit 42, a server communication unit 43, a parameter storage unit 44, a prediction unit 45, an input unit 46, and a display unit 47.

The congestion factor acquisition unit 41 of the portable terminal 11 either calculates the congestion factor of the host cell 13 at a predetermined time interval or acquired the congestion factor calculated by a block (not shown) and supplies the congestion factor to the congestion factor data accumulation unit 42. The timing at which to acquire the congestion factor does not necessarily have to be a fixed interval.

The congestion factor data accumulation unit 42 accumulates the congestion factors supplied from the congestion factor acquisition unit 41 during a period in which the server communication unit 43 connects to the server 12 and transmits the congestion factor data.

The server communication unit 43 connects to the server 12 at a predetermined timing at which the items of congestion factor data have been accumulated to a certain degree in the congestion factor data accumulation unit 42, such as approximately once per day, and transmits the items of congestion factor data accumulated in the congestion factor data accumulation unit 42 to the server 12.

In addition, in a case in which the updated parameters of the regression model are present in the server 12 when the server communication unit 43 connects to the server 12, the parameters are received and stored in the parameter storage unit 44. The parameter storage unit 44 stores the parameters of the regression model acquired from the server 12 and supplies the parameters to the prediction unit 45 as necessary.

The prediction unit 45 predicts (estimates) the congestion factor of the predetermined base station 13 other than the host cell 13 using the parameters of the regression model stored in the parameter storage unit 44.

The input unit 46 inputs the conditions for predicting the congestion factor of the predetermined base station 13 other than the host cell 13 to the prediction unit 45. For example, the input unit 46 allows the user to specify (input) the congestion factor of what time and of which base station 13 to predict, and supplies the information and the time for identifying the specified base station 13 to the prediction unit 45. In addition, for example, in a case in which the movement route and the destination of the user are predicted and base station 13 to connect to is predicted using the movement route and the destination, the input unit 46 is equivalent to the block which predicts the movement route and the destination of the user, and supplies the information for identifying the base stations 13 positioned in the surroundings of the movement route and the destination which are predicted using the block to the prediction unit 45. Here, as the information to identify the base station 13 input to the prediction unit 45, an ID which identifies the base station 13 can be exemplified.

The display unit 47 is, for example, configured of an LCD (Liquid Crystal Display), an organic EL display, or the like, and displays the prediction result of the prediction unit 45.

The server 12 includes a congestion factor data acquisition unit 61, a data preprocessing unit 62, a regression model learning unit 63, and a parameter transmission unit 64.

The congestion factor data acquisition unit 61 acquires (receives) the congestion factor data transmitted thereto at a predetermined timing from each of the plurality of portable terminals 11 and supplies the congestion factor data to the data preprocessing unit 62.

The data preprocessing unit 62 performs a predetermined preprocessing on the items of congestion factor data acquired by the large number of portable terminals 11 such that they become data suitable for the regression model learning unit 63 to learn, then the data preprocessing unit 62 supplies the processed data to the regression model learning unit 63. For example, the data preprocessing unit 62 merges the items of congestion factor data acquired by the large number of portable terminals 11 and performs a re-ordering of the merged items of congestion factor data in time series order and for each base station ID as the preprocessing. It is possible to alleviate the privacy issues of the user that owns the portable terminal 11 by merging the items of congestion factor data acquired by a large number of portable terminals 11 using the data preprocessing unit 62.

The regression model learning unit 63 learns the congestion factor of each of the base stations 13 based on the items of congestion factor data collected by the large number of portable terminals 11 using a predetermined regression model and generates the model parameters as the learning result. As a regression model which learns the congestion factor data, a support vector model or a relational vector regression model is adopted. The learning process is performed at a predetermined timing (for example, once per day) and (the parameters of) the regression model are updated, based on the items of data for learning which are accumulated until this point in time. In the learning process, all of the items of data which have been accumulated until this point in time may be used to perform re-learning, or only the items of data for learning which have been newly accumulated may be used to learn additionally. The regression model learning unit 63 is described as a unit which learns using a support vector regression model below, and subsequently, a relational vector regression model is described later.

When the portable terminal 11 connects in order to transmit congestion factor data thereto, the parameter transmission unit 64 transmits the updated model parameters of the learning model to the portable terminal 11. Furthermore, the transmission of the new model parameters after the update may also be executed at a different timing to the reception of the congestion factor data.

The portable terminal 11 and the server 12 are configured as described above. The details of the processes performed by the portable terminal 11 and the server 12 will be respectively described further.

Example of Congestion Factor Data

FIG. 3 shows an example of the congestion factor data which is acquired by the portable terminal 11 and accumulated in the congestion factor data accumulation unit 42.

As shown in FIG. 3, the congestion factor data is a data set of the date and time at which the congestion factor is acquired (calculated), the base station ID of the host cell 13, and the congestion factor.

The date and time are acquired from the system clock of the portable terminal 11. In addition to the date and time, the congestion factor data may also include information such as the day of the week and whether or not the day is a working day or a non-working day (including national holidays) as data items. Alternatively, it may also include information such as meteorological information (temperature, moisture, amount of rainfall, amount of snowfall, and the like), the conditions of the surroundings (brightness, noise, and the like), or information generated by an event. In addition, the base station ID is an ID which identifies the base station 13. The base station ID is the information estimating the area of the present location. Instead of the base station ID, the scramble code may also be used as the identification data, or both of the base station ID and the scramble code may be stored as the identification data of the base station 13. In smart phone applications and the like, an API is provided such that the base station ID of the host cell 13 may be acquired.

The congestion factor represents the congestion factor of the communications line of the host cell 13. For example, in the code division multiple access (CDMA) method, when the number of multiplexed DPCHs (Dedicated Physical Channels), in other words the number of users associated with the host cell 13, or the number of high speed downlink shared channels shared by a plurality of users in HSDPA (High Speed Downlink Packet Access) (the number of HS-DSCHs) increases, each DPCH or each HS-DSCH is diffused, however, the correlated output of each of the scrambling codes increases considerably. Accordingly, when the largest scrambling code correlated output is a and the smallest correlated output among the other scrambling code correlated outputs is b, it is thought that the correlated output b/the correlated output a increases as the number of users increases and the available capacity decreases, or as the interference increases. Therefore, it is possible for the congestion factor acquisition unit 41 to use the ratio b/a of the correlated output a and the correlated output b as (an index to indicate) the congestion factor. Furthermore, the method of calculating the congestion factor is not limited to the example described above, and may be suitably determined according to predetermined conditions such as the communications method.

Figure 4:
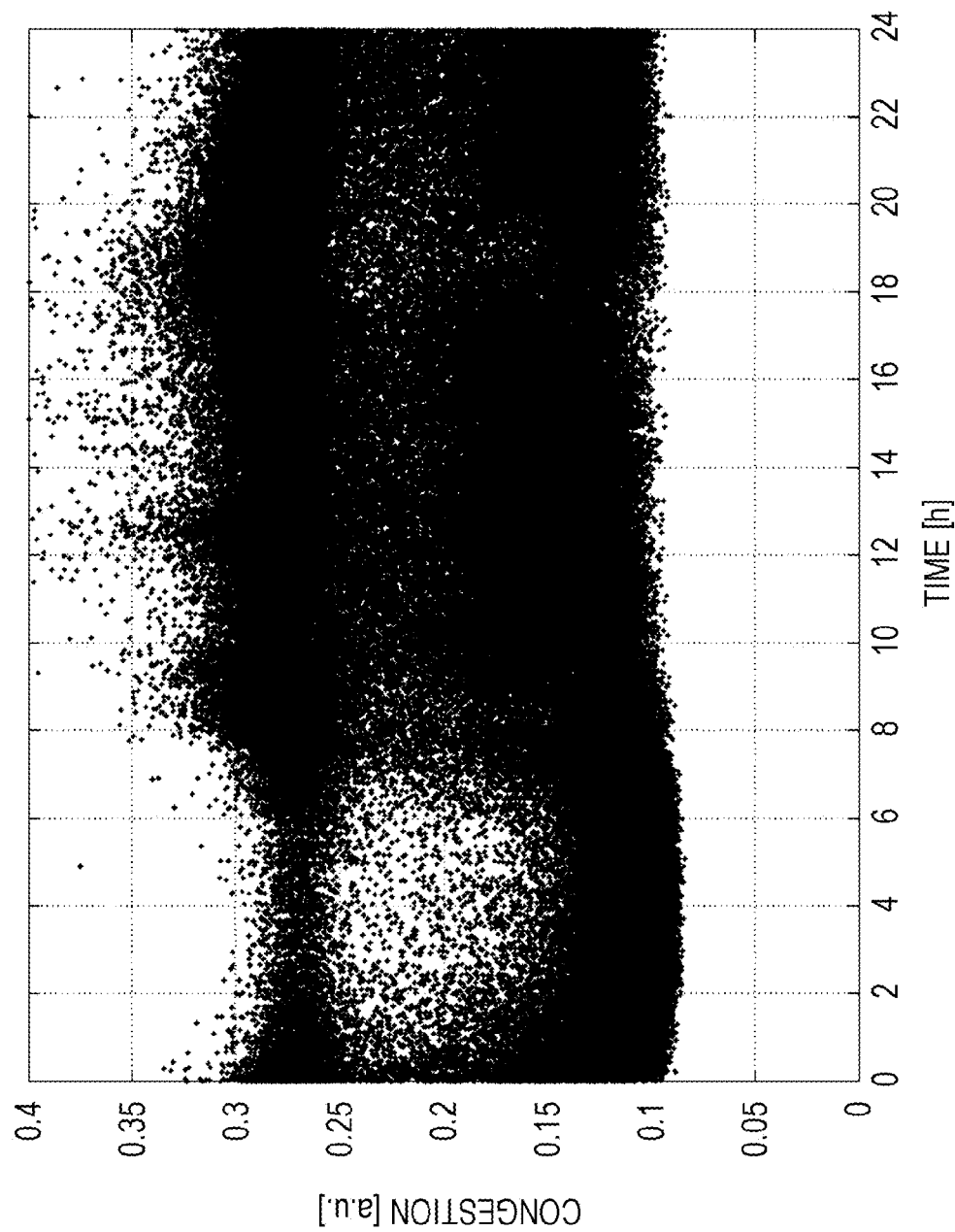
FIG. 4 is a graph of the congestion factor collected during a predetermined period.

FIG. 4 is a graph showing the data in which the congestion factor of a particular base station 13 is measured for a predetermined period (approximately two months) at 15 second intervals, where the items of data of each day are overlaid on the portable terminal 11. This data is obtained by measuring the congestion factor of one base station 13 using a portable terminal 11, however, even in a case in which the congestion factors acquired by a plurality of portable terminals 11 are merged by the data preprocessing unit 62 and the items of congestion factor data relating to one particular base station 13 are aggregated, data similar to that shown in FIG. 4 is obtained.

The horizontal axis of FIG. 4 shows the time during one day (from 0:00 to 24:00) and the vertical axis shows the congestion factor. It is represented that the larger the value of the congestion factor, the more congested it is.

From the congestion factor data of FIG. 4, two states, a "congested state" where the congestion factor is in the vicinity of "0.3" and a "non-congested state" where the congestion factor is in the vicinity of "0.1", are subtly recognizable. In FIG. 4, it is considered that the probability of observing the two states, the "congested state" and the "non-congested state", changes over time. The prediction unit 45 has only to be able to predict the probability of observing the two states, the "congested state" and the "non-congested state". However, it is difficult to directly ascertain the transition between the observation probabilities of the two states in the state of FIG. 4.

Figure 5:
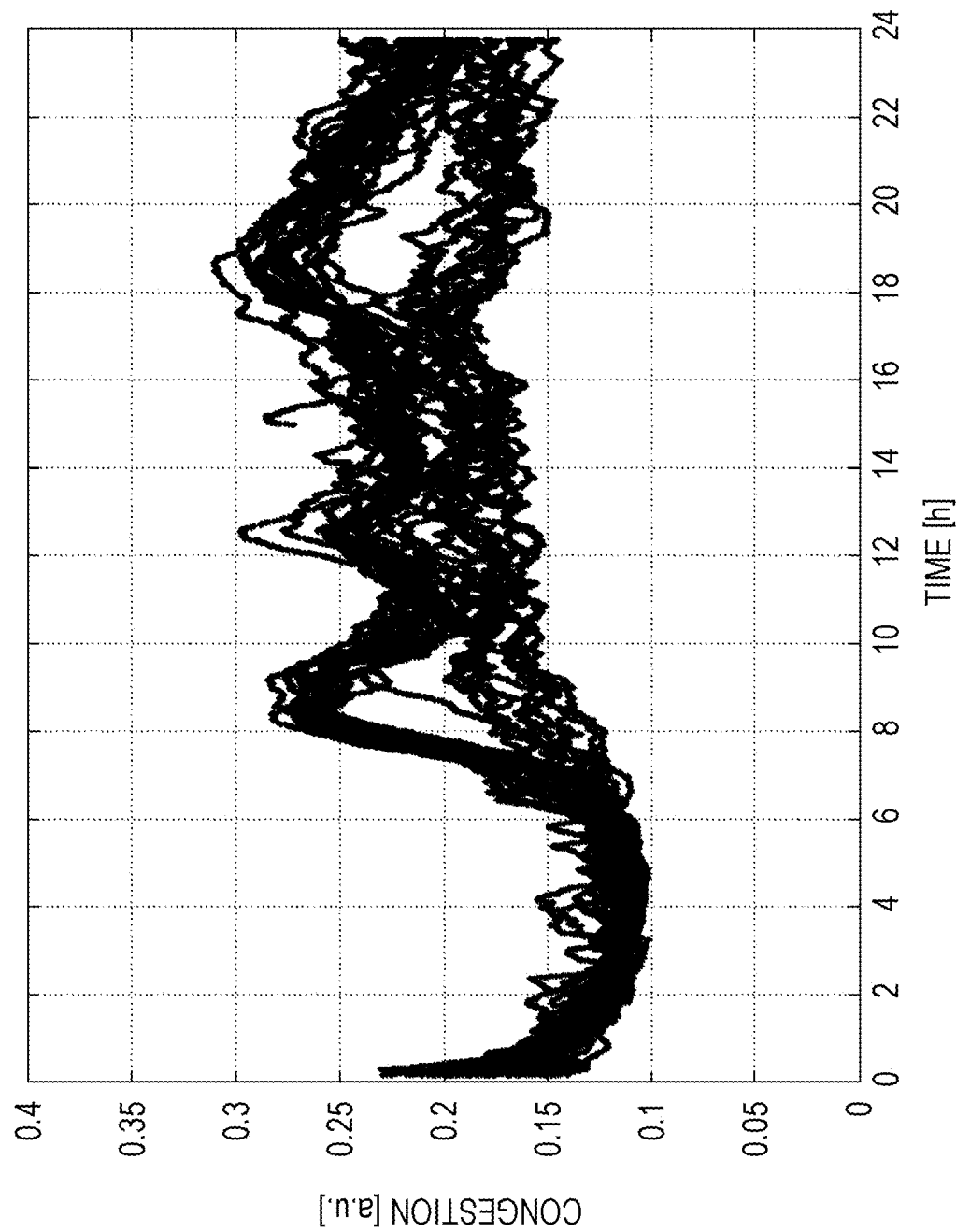
FIG. 5 is a view showing the average congestion factor calculated as the moving average of the congestion factor.

FIG. 5 shows the data of the average congestion factor calculated as the moving average of the data which is the total of 40 minutes of data, 20 minutes preceding and following the data of the congestion factor, shown in FIG. 4.

When the data is plotted as the average congestion factor, as in FIG. 5, it is easier to recognize the transition over time than in FIG. 4. For example, the average congestion factor from approximately 0:00 to 8:00 exhibits a similar trend every day. Meanwhile, there are two major patterns of transition to the average congestion factor from 8:00 to 24:00. Since the location that the base station 13 which has acquired this data is a business district, the data with a trend for the congestion factor to be high from 8:00 to 24:00 is data of a working day, and the data with a trend for the congestion factor in this period to be low is expected to be the data of a non-working day.

Figure 6:
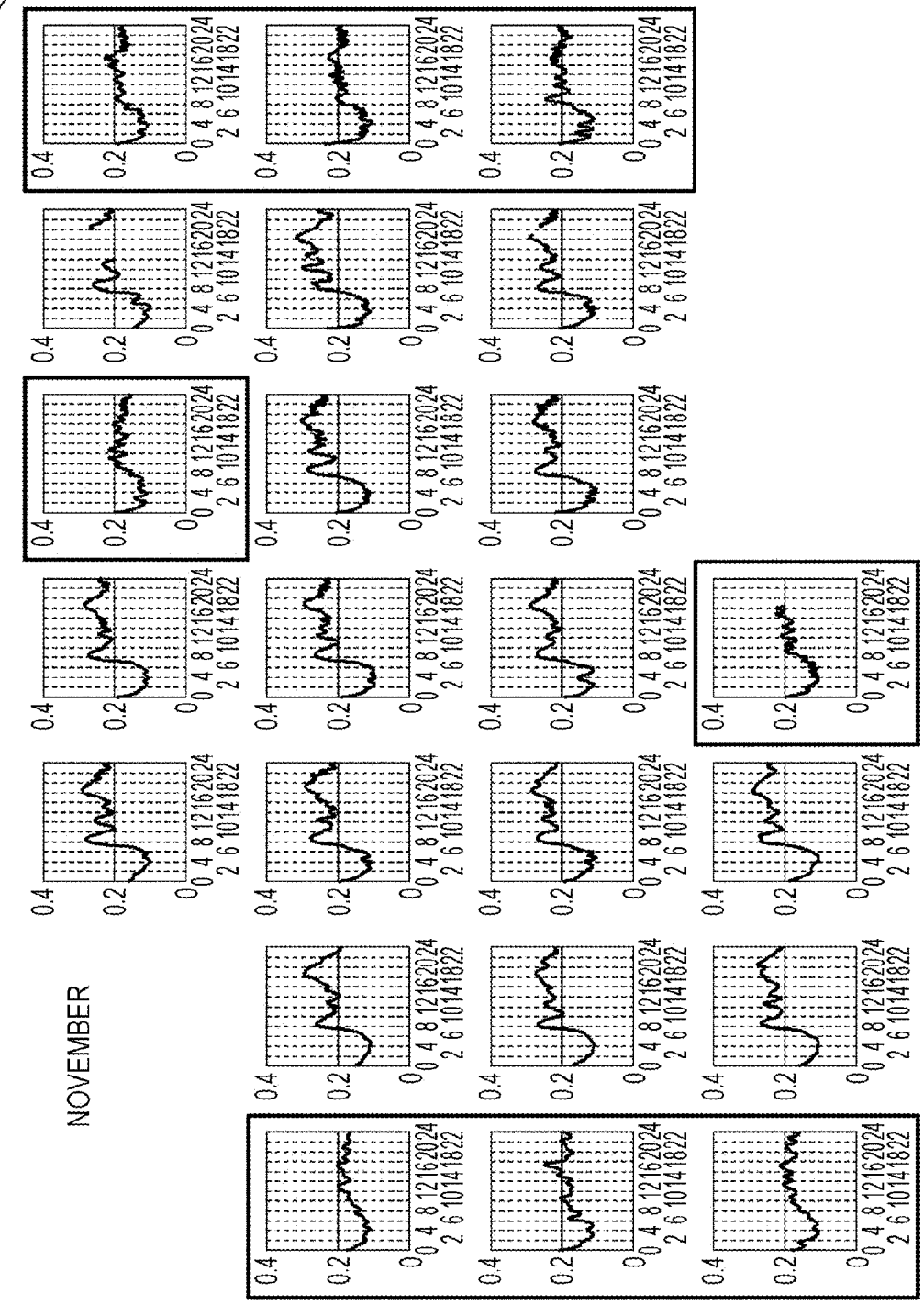
FIG. 6 is a view showing the daily average congestion factor over the period of one month.

Therefore, for example, of the data acquisition periods shown in FIG. 5, when the average congestion factor is classified by date in relation to the month of November, this may be represented as shown in FIG. 6.

Bold line frames in FIG. 6 show the average congestion factor of the days which are a Saturday, a Sunday, and national holidays (the 3rd of November and the 23rd of November). From FIG. 6, it may be understood that the average congestion factor of the weekends and the national holidays exhibits a different trend from that of the average congestion factor of the working days. In other words, in FIG. 5, it is discovered that the two patterns of transition observed in the average congestion factor from 8:00 to 24:00 are the difference between working days and non-working days.

From the above, it is understood that the trend of the congestion factor is different in working days and non-working days. Therefore, for example, as the learning model, dividing the items of data into working days and non-working days and learning the data (obtaining the parameters) can be considered. Here, when predicting the congestion factor as the learning model, the model to be used is changed according to whether it is a working day or a non-working day.

However, there are several issues with learning by dividing the items of data case-by-case based on some condition in this manner. For example, it is not certain as to whether or not the patterns of the congestion factor are in fact only caused by whether it is a working day or a non-working day, and there is a possibility that various patterns with different causes exist. In other words, it is necessary to perform the modeling after completely understanding the trends of the collected data, and when there are a large number of cases to account for, the arithmetic processing to perform becomes extremely great.

In other words, a learning model in which it is possible to input the conditions considered to be necessary, such as the day of the week, non-working days and working days, and that it is possible to perform learning using one learning model is preferable. As such a learning model, in the present embodiment, a support vector regression model, which is a type of kernel regression model, is adopted. The support vector regression model may be typified in that it is possible to reduce the number of parameters in comparison to a general kernel regression model. In this manner, the communication capacity between the portable terminal 11 and the server 12 during transmission and reception of the parameters, and the storage capacity of the parameter storage unit 44 of the portable terminal 11 may be reduced.

Support Vector Regression Model

The support vector regression model is described below.

Figure 7:
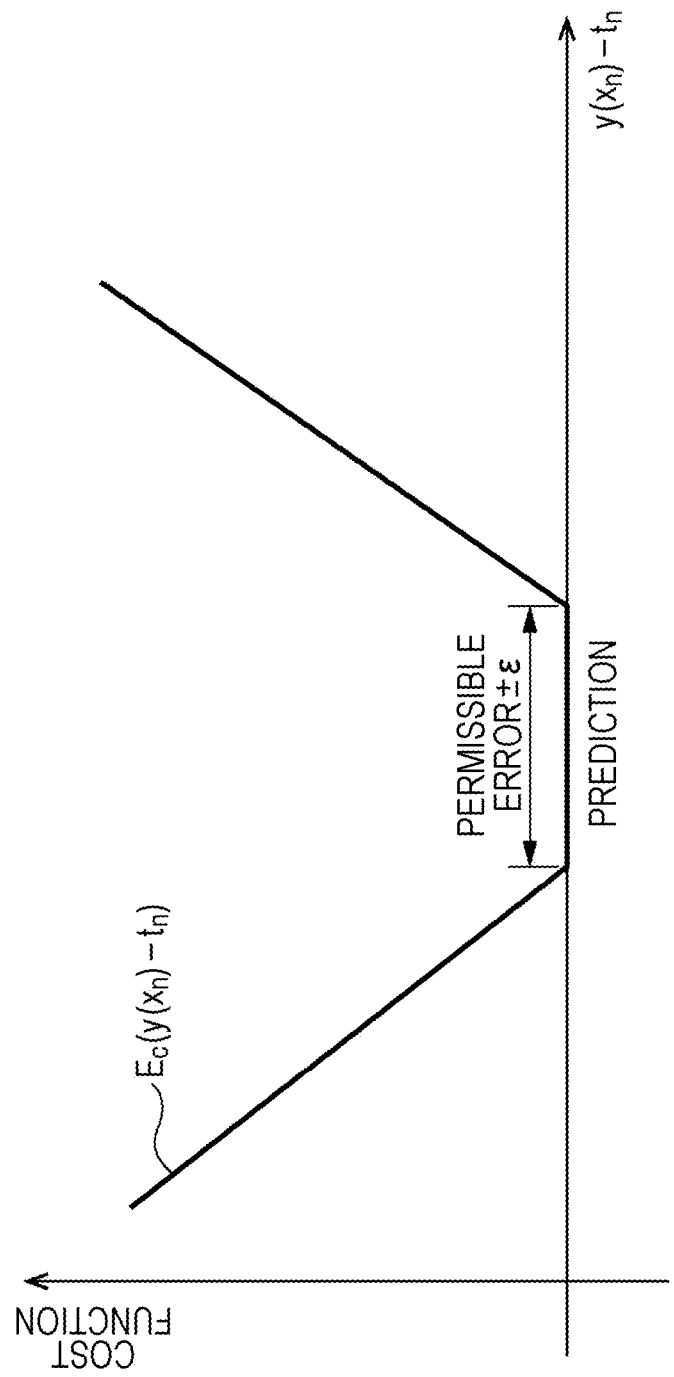
FIG. 7 is a view showing the E-permissible error function in a support vector regression.

The support vector regression is a type of regression analysis in which, for the weighting parameters of the linear basis, parameters which are optimizing cost functions are used. As the cost function, the square error is often used in an ordinary regression model, however, in the support vector regression, an $\epsilon$ permissible error function as shown in FIG. 7 is used.

The support vector regression is described in detail in "Pattern Recognition and Machine Learning" (last volume) by C. M. Bishop, Springer publishing.

In the support vector regression model, the output criterion variable y(x) is represented in the following Expression (1) in relation to the input explanatory variable x.

$$y(x) = \sum_{m=1}^{M} w_m \phi_m(x) + b \quad (1)$$

In other words, the criterion variable y(x) is represented by the sum of the product of M basis function $\phi_m(x)$ (m=1, . . . , M), and the weighting factor $w_m$. Furthermore, here, M does not have a clear magnitude relationship with the number of data items N. Here, the basis function $\phi_m(x)$, for example, is provided using a Gaussian basis with a normal distribution of the predetermined parameters as the basis. The b in Expression (1) is a bias item and the parameter obtained through learning is the weighting factor $w_m$ of Expression (1).

In the present embodiment, the criterion variable y(x) of the Expression (1) is the congestion factor, and the "date", "time", and "base station ID" shown in FIG. 3 are the explanatory variables x.

Therefore, the explanatory variable x is D dimensional (D≥1) data, and when the D dimensional data of the mth basis function $\phi_m(x)$ is to be distinguished, the explanatory variable x is represented as $x_{m,1:D} = \{x_{m,1}, x_{m,2}, \ldots, x_{m, D-1}, x_{m,D}\}$ (1:D is an abbreviation of everything from 1 to D). When x is, for example, the congestion factor data of a set of "time", "day of the week", "working day or non-working day", and "base station ID", then x is 4-dimensional data. The "time" information is, for example, an hourly display, where minutes and seconds may be represented using a decimal point. The "day of the week" information may be represented by allocating each day of the week with a number from 1 to 7. The "working day or non-working day" information may, for example, be represented by allocating working days with "0" and non-working days with "1".

The number of dimensions D of the explanatory variable x can be further expanded if any other information which may be input is present. For example, if meteorological conditions such as the temperature, the moisture, the sunlight, the rainfall amount, the snowfall amount, the wind direction, and the wind speed are related to the congestion factor, meteorological information such as this may be input. In addition, traffic conditions considered to be related to the position when a user moves may also be input. However, when information with no correlation is input as the explanatory variable x, there are cases in which the prediction accuracy deteriorates. Therefore, it is desirable to set the explanatory variable x to only information anticipated to have a correlation to the criterion variable y(x).

In the regression model learning unit 63 of the server 12, the weighting factor $w_m$ of the above described Expression (1) is obtained as a parameter of the regression model.

The weighting factor $w_m$ is obtained as a factor that minimizes the following error function E(w) when a learning data set which is a set of the explanatory variable x and the observed value t of the criterion variable y(x), and the basis vector φ are passed. The error function E(w) is represented as the sum of the criterion variable $y(x_n)$ predicted from the explanatory variable x of the learning data set, and the cost function $E_c(y(x_n)-t_n)$ of the deviation $(y(x_n)-t_n)$ between the observed value $t_n$ and the criterion variable $y(x_n)$ across the entire learning data set.

$$E(w) = \sum_{n=1}^{N} E_c(y(x_n) - t_n) \to \min$$

However, there are also cases in which, when the weighting factor $w_m$ which minimizes the error function E(w) is an extremely large value, the error function E(w) in relation to the learning data set decreases. However, in cases in which the error function E(w) decreases due to the weighting factor $w_m$ being an extremely large value, the prediction performance in relation to unknown data is not good. Such a situation is generally called as "overfitting", or to be "not generalized".

Therefore, in order to avoid obtaining such a weighting factor $w_m$ which is not generalized, the weighting factor $w_m$ is obtained by minimizing the error function E(w) which has constraints, that is, a regularization applied in relation to Expression (2).

$$E(w) = C\sum_{n=1}^{N} E_c(y(x_n) - t_n) + \frac{1}{2}\|w\|^2 \quad (2)$$

The method of regularization of Expression (2) is a method of adding the sum of the squares of the weighing factors $w_m$ to the error function. The sum of the squares tends to be simple to calculate, which is why such a method is adopted. In addition, C(>0) which is multiplied with the summation of the cost function $E_c(y(x_n)-t_n)$ is a constant for determining the strength of the regularization.

The cost function $E_c(y(x_n)-t_n)$ of the Expression (2) used in the support vector regression introduces the permissible error ϵ, and is represented by 0 when the absolute value of the difference between the criterion variable $y(x_n)$ and the observed value $t_n|y(x_n)-t_n|$ is less than the permissible error ϵ, and when the observed value $t_n$ is greater than the permissible error ϵ, is represented by the ϵ permissible error function in which a linear cost arises.

The following Expression (3) is the definitional equation of the ϵ permissible error function, and FIG. 7 shows the ϵ permissible error function $E_c(y(x_n)-t_n)$ represented by Expression (3).

$$E_c(y(x_n) - t_n) = \begin{cases} 0, & |y(x_n) - t_n| < \varepsilon \\ |y(x_n) - t_n|, & \text{otherwise} \end{cases} \quad (3)$$

When the slack variable ξ and ξ~ are introduced in order to process the absolute value of Expression (3) (ξ>0, ξ~>0) this may be represented as follows.

$$\xi_n \geq t_n - y(x_n) - \epsilon, \; t_n - y(x_n) > \epsilon$$

$$\xi_n^\sim \geq y(x_n) - t_n - \epsilon, \; t_n - y(x_n) < -\epsilon \quad (4)$$

Therefore, Expression (2) may be represented as follows.

$$E(w) = C\sum_{n=1}^{N} (\xi_n + \xi_n^\sim) + \frac{1}{2}\|w\|^2 \quad (2')$$

Therefore, the Expression (2') becomes the error function E(w) for minimizing.

According to the above, the regression model learning unit 63 performs obtaining the weighting factor $w_m$ which minimizes the error function E(w) of Expression (2') under the constraint conditions of Expression (4), ξ, ξ~>0. The regression model learning unit 63 uses the Lagrangian method of undetermined multipliers in order to solve the minimization problem.

Expression (2') under the constraint conditions of Expression (4), ξ, ξ~>0, when using Lagrangian undetermined multipliers μ, μ~, α, α~, may be written as in Expression (5).

$$L = C\sum_{n=1}^{N}(\xi_n + \xi_n^\sim) + \frac{1}{2}\|w\|^2 - \sum_{n=1}^{N}(\mu_n \xi_n + \mu_n^\sim \xi_n^\sim) - \quad (5)$$

$$\sum_{n=1}^{N} a_n(\varepsilon + \xi_n + y_n - t_n) - \sum_{n=1}^{N} a_n^\sim(\varepsilon + \xi_n^\sim - y_n + t_n)$$

The third term of Expression (5) corresponds to the ξ, ξ~>0 constraint, and the fourth and fifth terms correspond to the constraints of Expression (4).

When setting the partial differential of w, b, ξ, ξ~ to zero so as to minimize the Lagrangian function of Expression (5), when these variables are cancelled out, ultimately, the only undetermined variables are the Lagrangian undetermined multipliers α and α~, and the Expression (5) minimizes the following functions (Expression (3')) which are dual functions thereof.

$$L(a, a^\sim) = -\frac{1}{2}\sum_{n=1}^{N}\sum_{m=1}^{N}(a_n - a_n^\sim)(a_m - a_m^\sim)k(x_n, x_m) - \quad (3')$$

$$\varepsilon\sum_{n=1}^{N}(a_n + a_n^\sim) + \sum_{m=1}^{N}(a_n - a_n^\sim)t_n$$

However, $k(x_n, x_m)$ of Expression (5) is a kernel function which may be represented as follows using a basis function vector φ(x) in which all of the elements of the basis function are arranged vertically, where $k(x_n, x_m)=k(x, y)$.

$$k(x,y) = \phi(x)^T \phi(y) \quad (6)$$

$\phi(x)^T$ represents the transposition of φ(x).

The kernel function k(x, y) of Expression (6) is clearly defined if the basis function vector φ is known, however, even if the basis function vector φ is undetermined, for example, it is possible to define the kernel function k(x, y) as in Expression (7).

$$k(x, y) = \prod_{d=1}^{D} \exp\left(-\frac{(x_d - y_d)^2}{2\sigma_d^2}\right) \quad (7)$$

The kernel function k(x, y) of Expression (7) is known as the gauss kernel, and D is the number of dimensions of the explanatory variable x of the input. For σ, for example, the standard deviation of the explanatory variable x of the input may be used as it is.

When the kernel function k(x, y) of Expression (7) is used, the Expression (1) may be re-written as in the following Expression (8).

$$y(x) = \sum_{n=1}^{N} (a_n - a_n^\sim) k(x, x_n) + b \qquad (8)$$

Here, the bias item b of Expression (8) may be provided by calculating it beforehand using the following expression or the like.

$$b = \frac{1}{N} \left( \sum_{n=1}^{N} (t_n - \varepsilon) - \sum_{n=1}^{N} \sum_{m=1}^{N} (a_m - a_m^\sim) k(x_n, x_m) \right) \qquad (9)$$

Furthermore, when using kernel notation in such a manner, by setting M of Expression (1) to the number of data items N, this becomes an equivalent expression to Expression (1).

In this manner, the support vector regression, instead of obtaining the weighting factor $w_m$ of Expression (1), returns to obtaining the parameters (the Lagrangian undetermined multipliers) $a_n$ and $a_n^\sim$ of Expression (8).

Here, as the method of obtaining the parameters $a_n$ and $a_n^\sim$ of Expression (8), description is given of (1) a method in which they are solved using the simultaneous equations, and (2) a method in which they are solved using the gradient method.

Parameter Calculation Process Using Simultaneous Equation

Figure 8:
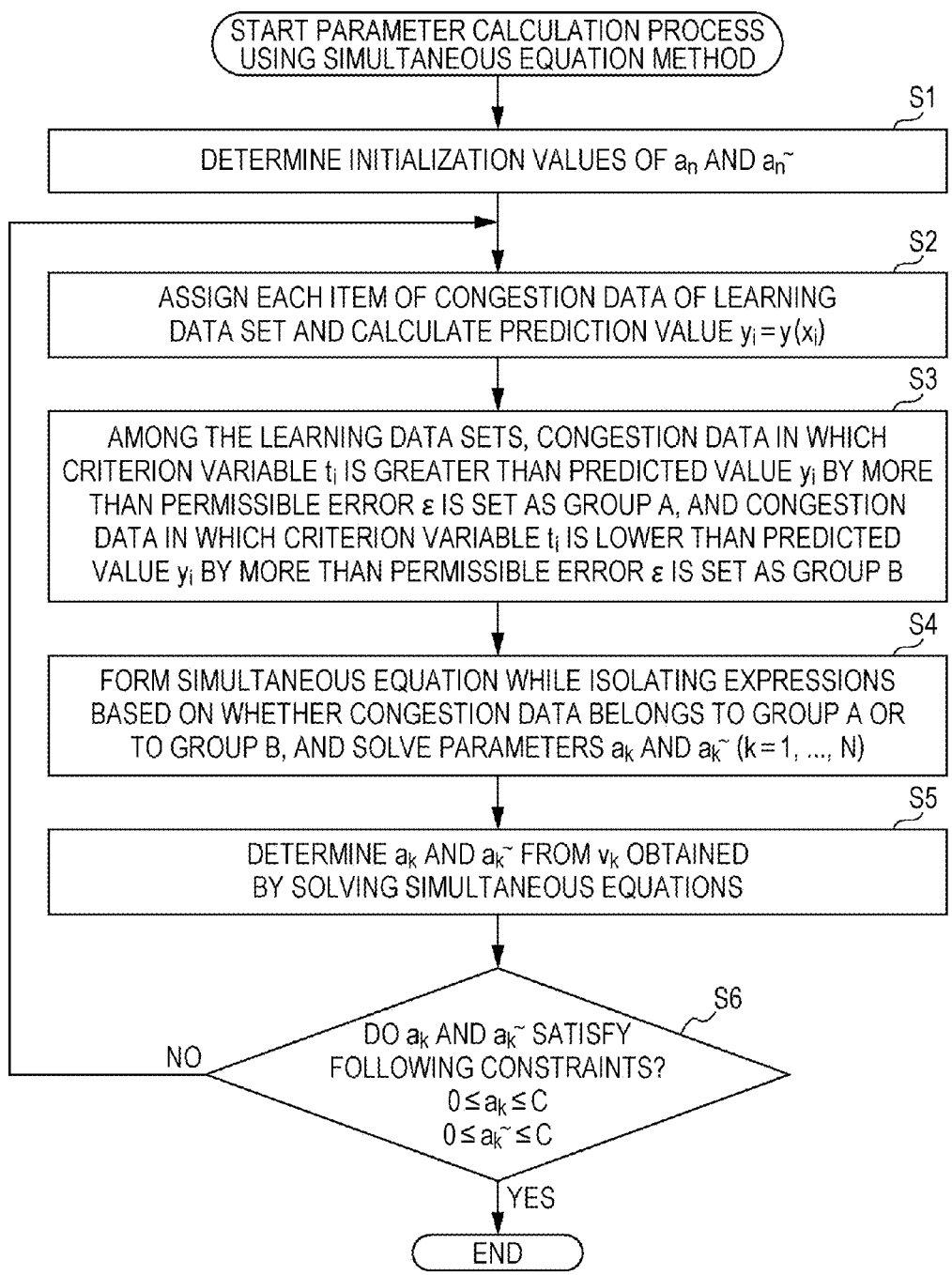
FIG. 8 is a flowchart of the parameter calculation process using a simultaneous equation.

FIG. 8 is a flowchart showing the parameter calculation process to obtain the parameters $a_n$ and $a_n^\sim$ of the regression model using a simultaneous equation.

First, in step S1, the regression model learning unit 63 determines the initialization values of the parameters $a_n$ and $a_n^\sim$ using a predetermined method (n=1, ..., N).

In step S2, the regression model learning unit 63 assigns each item of congestion data of the learning data set to Expression (8) and calculates the prediction value $y_i = y(x_i)$.

In step S3, the regression model learning unit 63 sets the items of congestion data in which the criterion variable $t_i$ is greater than the prediction value $y_i$ by more than the permissible error ε, in other words, the items of data which satisfy $(t_i - y_i) > \varepsilon$, as group A. In addition, the regression model learning unit 63 sets the items of congestion data in which the criterion variable $t_i$ is lower than the prediction value $y_i$ by more than the permissible error ε, in other words, the items of data which satisfy $(t_i - y_i) < \varepsilon$, as group B.

In step S4, the regression model learning unit 63 forms a simultaneous equation while isolating the expressions based on whether the items of congestion data belong to group A or to group B, and solves the parameters $a_k$ and $a_k^\sim$ (k=1, ..., N).

In other words, the Expression (10-1) below is valid for the items of congestion data belonging to group A, and the Expression (10-2) below is valid for the items of congestion data belonging to group B. Therefore, the regression model learning unit 63 forms a simultaneous equation in which the items of congestion data are assigned to Expression (10-1) or to Expression (10-2) based on whether the items of congestion data belong to group A or to group B, and solves the parameters $a_k$ and $a_k^\sim$ (k=1, ..., N).

$$\frac{\partial L}{\partial a_k} = -\sum_{m=1}^{N} k(x_k, x_m) \cdot v_m - \varepsilon + t_k = 0 \qquad (10\text{-}1)$$

$$\frac{\partial L}{\partial a_k^\sim} = \sum_{m=1}^{N} k(x_k, x_m) \cdot v_m - \varepsilon - t_k = 0 \qquad (10\text{-}2)$$

Here, $v_k = a_k - a_k^\sim$. Furthermore, when the items of congestion factor data do not belong to either group A or to group B, $v_k$ is zero ($v_k = 0$) and the summation (Σ) item is omitted.

In step S5, the regression model learning unit 63 determines the parameters $a_k$ and $a_k^\sim$ from $v_k$ which are obtained by solving the simultaneous equation. In other words, the parameters $a_k$ and $a_k^\sim$ are determined by the Expression (11-1) below for $v_k$ items belonging to group A, and by the Expression (11-2) below for $v_k$ items belonging to group B.

$$(a_k, a_k^\sim) = (v_k, 0) \qquad (11\text{-}1)$$

$$(a_k, a_k^\sim) = (0, -v_k) \qquad (11\text{-}2)$$

In step S6, the regression model learning unit 63 determines whether or not the determined parameters $a_k$ and $a_k^\sim$ satisfy the following constraints.

$$0 \leq a_k \leq C$$

$$0 \leq a_k^\sim \leq C$$

In step S6, in a case in which the determined parameters $a_k$ and $a_k^\sim$ are determined not to satisfy the constraints, the process returns to step S2, and the processes from thereon are repeated. In other words, the processes of step S2 through S6 are executed once again using the determined parameters $a_k$ and $a_k^\sim$.

Meanwhile, in step S6, in a case in which the determined parameters $a_k$ and $a_k^\sim$ are determined to satisfy the constraints, the process ends.

Parameter Calculation Process Using Gradient Method

Figure 9:
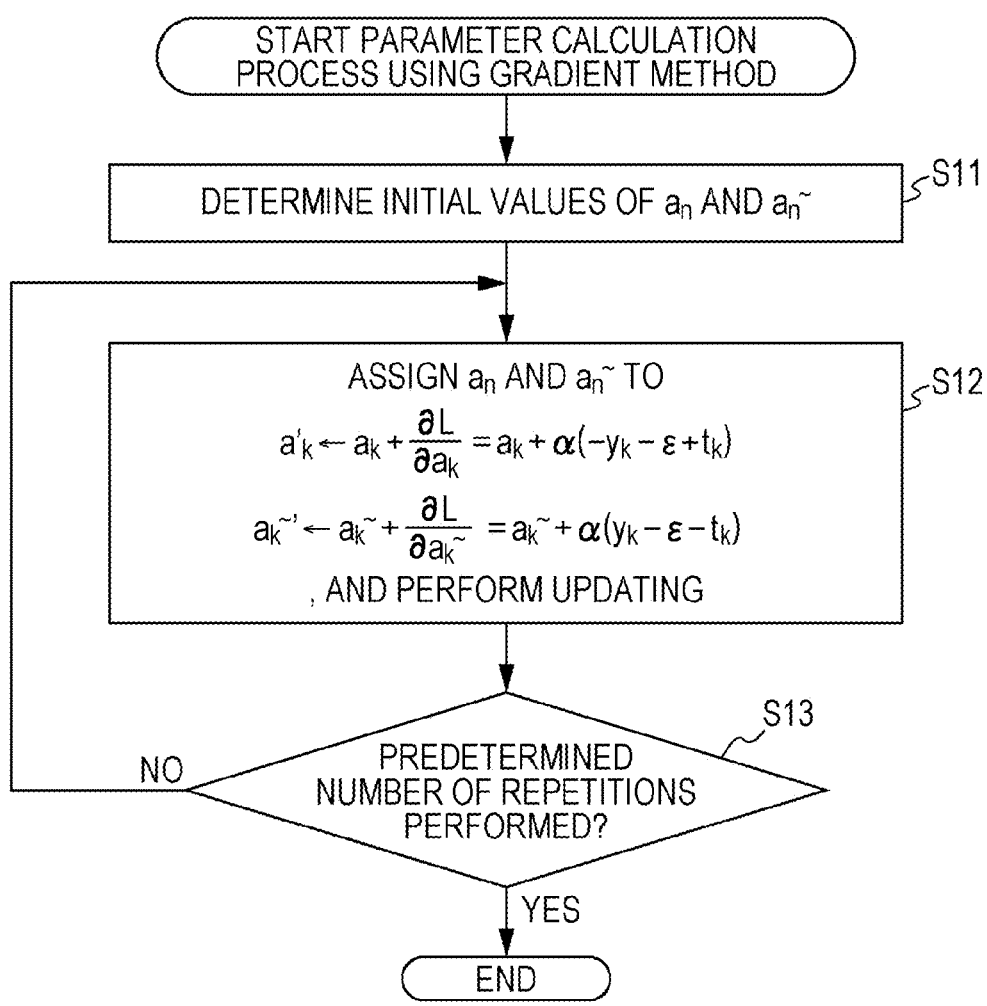
FIG. 9 is a flowchart of the parameter calculation process using a gradient method.

FIG. 9 is a flowchart showing the parameter calculation process to obtain the parameters $a_n$ and $a_n^\sim$ of the regression model using a gradient method.

In this process, first, in step S11, the regression model learning unit 63 determines the initialization values of the parameters $a_n$ and $a_n^\sim$ using a predetermined method (n=1, ..., N).

In step S12, the regression model learning unit 63 assigns and updates the parameters $a_n$ and $a_n^\sim$ to Expression (12) below and acquires the parameters $a_n'$ and $a_n'^\sim$ after they are updated.

$$a_k' \leftarrow a_k + \frac{\partial L}{\partial a_k} = a_k + \alpha(-y_k - \varepsilon + t_k) \qquad (12)$$

$$a_k^{\sim\prime} \leftarrow a_k^\sim + \frac{\partial L}{\partial a_k^\sim} = a_k^\sim + \alpha(y_k - \varepsilon - t_k)$$

In step S13, the regression model learning unit 63 determines whether or not the updating of the parameters $a_n$ and $a_n^\sim$ have been repeated a predetermined number of times or not.

In step S13, in a case in which the regression model learning unit 63 determines that the updating of the parameters $a_n$ and $a_n\sim$ has not been repeated a predetermined number of times, the process returns to step S12 and the updating of the parameters $a_n$ and $a_n\sim$ is repeated.

Meanwhile, in step S13, in a case in which the updating of the parameters $a_n$ and $a_n\sim$ is determined to have been repeated a predetermined number of times, the regression model learning unit 63 ends the processing.

Furthermore, the ending condition of step S13 may also be determined by whether or not the change of the Lagrangian function of Expression (3') caused by the updating of the parameters $a_n$ and $a_n\sim$ is a predetermined threshold (convergence width) or less or not, instead of by the number of repetitions of the parameter updating.

FIG. 10 shows an example of the parameters $a_n$ and $a_n\sim$ of the support vector regression model calculated using any of the above described methods.

The parameters $a_n$ and $a_n\sim$ shown in FIG. 10 are stored in the regression model learning unit 63 as the learning result of the regression model. Furthermore, since the parameters $a_n$ and $a_n\sim$ correspond to the explanatory variables $x_{n,1:D}$, the parameters $a_n$ and $a_n\sim$ are stored as a set of the explanatory variables $x_{n,1:D}$ and the criterion variable $t_n$.

Furthermore, when storing the parameters of the regression model to the regression model learning unit 63, among the parameters $a_n$ and $a_n\sim$, it is possible to omit parameters in which $a_n$ and $a_n\sim$ are both zero. The support vector regression may be typified in that a large number of parameters occur in which $a_n$ and $a_n\sim$ are both zero, and it is possible to reduce the storage capacity by adopting the support vector regression model as the learning model.

Description of Data Update Process

Figure 11:
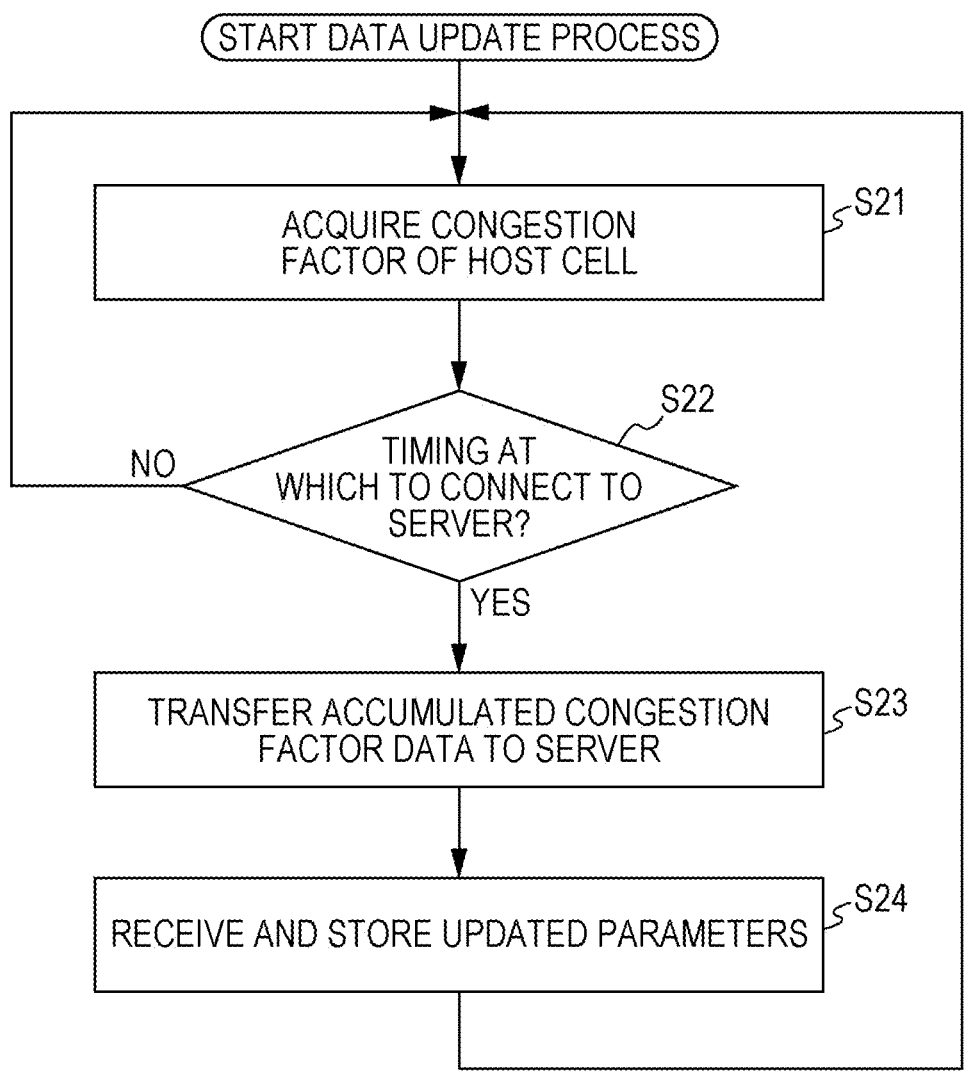
FIG. 11 is a flowchart illustrating the data update process which performs parameter updating of the support vector regression model.

Description is given of the data updating process in which the portable terminal 11 performs acquisition of the congestion factor of the host cell 13, and the parameter updating of the support vector regression model with reference to the flowchart of FIG. 11.

First, in step S21, the congestion factor acquisition unit 41 of the portable terminal 11 acquires (calculates) the congestion factor of the host cell 13. The congestion factor of the host cell 13 may be acquired at a predetermined fixed interval, and, for example, the congestion factor of the host cell 13 may also be acquired irregularly, such as when a user performs a command to measure the congestion factor. The congestion factor acquired by the congestion factor acquisition unit 41 is supplied to the congestion factor data accumulation unit 42 and accumulated along with the explanatory variables of "time", "day of the week", "working day or non-working day", and "base station ID".

In step S22, the server communication unit 43 determines whether or not it is the timing to connect to the server 12. In the portable terminal 11, the timing at which to transmit the congestion factor data accumulated in the congestion factor data accumulation unit 42, is predetermined such as once per day, and the server communication unit 43 determines whether or not it is that timing (the set time).

In step S22, in a case in which it has been determined that it is not the timing to connect to the server 12, the process returns to step S21. Meanwhile, in a case in which it has been determined that it is the timing to connect to the server 12 in step S22, the process proceeds to step S23.

In step S23, the server communication unit 43 transmits the congestion factor data accumulated in the congestion factor data accumulation unit 42 to the server 12.

In step S24, the server communication unit 43 receives the updated parameters $a_n$ and $a_n\sim$ of the support vector regression model as well as the explanatory variables $x_k$ thereof from the server 12, and stores them in the parameter storage unit 44 (n=1, . . . , N). In a case in which the parameters $a_n$ and $a_n\sim$ have not yet been updated, the process of step S24 is skipped.

When the updated parameters $a_n$ and $a_n\sim$ and the explanatory variables $x_k$ thereof are stored in the parameter storage unit 44, the process returns to step S21 and the process from thereon is executed once more. Accordingly, the congestion factor of the host cell 13 is acquired until the power supply of the portable terminal 11 is turned off, and the congestion factor data is accumulated.

Description of Prediction Process

Figure 12:
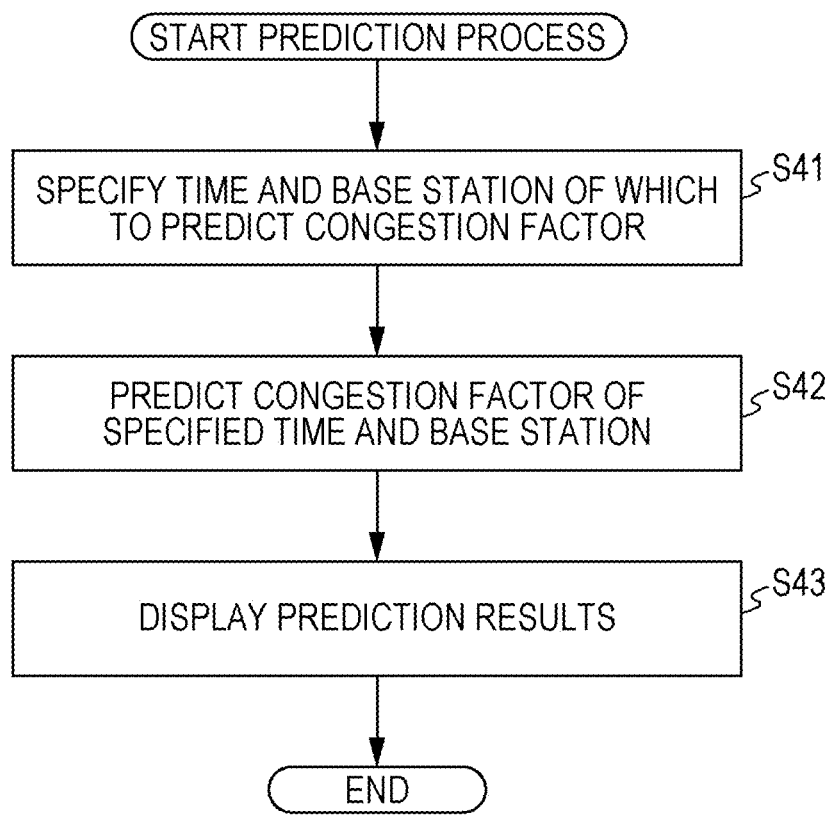
FIG. 12 is a flowchart illustrating the prediction process in which the congestion factor is predicted.

FIG. 12 is a flowchart describing the prediction process which predicts the congestion factor of the predetermined base station 13 other than the host cell 13 using the parameters of the support vector regression model acquired by the portable terminal 11.

First, in step S41, the input unit 46 of the portable terminal 11 allows the user to specify the time and the base station 13 for which to predict the congestion factor and inputs the specified time and base station 13 to the prediction unit 45.

In step S42, the prediction unit 45 predicts (estimates) the congestion factor of the time and the base station 13 specified by the user using the parameters of the support vector regression model stored in the parameter storage unit 44.

In step S43, the prediction unit 45 supplies the prediction results to the display unit 47 and makes the display unit 47 display the prediction results. The display unit 47 displays the prediction results supplied from the prediction unit 45 and ends the processing.

Furthermore, generally, the user does not know the position and base station ID of the base station 13. Therefore, the base station ID and the base station ID table corresponding to the coverage area thereof are stored in the internal memory of the portable terminal 11, the user is allowed to input the location (address), the place name, or the like, which they want to predict the congestion factor of, and the input unit 46 or the prediction unit 45 may convert the input location or place name into a base station ID based on the stored base station ID table.

Description of Learning Process

Next, the learning process in which the server 12 learns (updates) the parameters of the support vector regression model is described with reference to the flowchart of FIG. 13.

First, in step S61, the congestion factor data acquisition unit 61 acquires (receives) the congestion factor data transmitted thereto at a predetermined timing from each of the portable terminals 11 and supplies the congestion factor data to the data preprocessing unit 62.

In step S62, the data preprocessing unit 62 merges the items of congestion factor data acquired by each of the portable terminals 11, and in step S63, performs a re-ordering of the merged items of congestion factor data in time series order.

Furthermore, in step S64, the data preprocessing unit 62 determines whether or not to obtain the parameters of the support vector regression model for each of the base stations. Whether or not to obtain the parameters of the support vector regression model for each of the base stations is, for example, set in advance using a settings file.

In step S64, in a case in which it is determined that the parameters are to be obtained for each of the base stations, the process proceeds to step S65, and the data preprocessing unit 62 classifies the congestion factor data which has been re-ordered in time series order by the base station. In other words, the data preprocessing unit 62 classifies the congestion factor data which has been re-ordered in time series order by the base station ID.

Furthermore, in step S66, the data preprocessing unit 62 calculates the moving average of the congestion factor for a predetermined duration in relation to the congestion factor data arranged in time series order for each base station, and calculates the moving averaged congestion factor (in other words, the average congestion factor). The congestion factor data in which the (values of) the congestion factor items are replaced with the average congestion factor is supplied to the regression model learning unit 63 from the data preprocessing unit 62 as new data for learning.

In step S67, the regression model learning unit 63 obtains the parameters of the support vector regression model for each base station using the methods described with reference to FIG. 8 or FIG. 9. In other words, the regression model learning unit 63 obtains the parameters of the support vector regression model to estimate the congestion factor for each base station using the new data for learning supplied from the data preprocessing unit 62 and all of the data for learning accumulated until this point as the learning data set.

Meanwhile, in step S64, in a case in which it is determined that the parameters of the support vector regression model are to be obtained using the entirety of the data for learning, the process proceeds to step S68, and the data preprocessing unit 62 classifies the congestion factor data which has been re-ordered in time series order by the base station. Furthermore, in step S69, the data preprocessing unit 62 calculates the moving average of the congestion factor for a predetermined duration in relation to the congestion factor data arranged in time series order for each base station, and calculates the average congestion factor.

Furthermore, in step S70, the data preprocessing unit 62 once more merges the congestion factor data, in which the (values of) the congestion factor items are replaced with the average congestion factor, with the congestion factor data which is arranged in time series order, for each base station.

In step S71, the regression model learning unit 63 obtains the parameters of the support vector regression model with the new data for learning and the data for learning till this point as the learning data set using the methods described with reference to FIG. 8 or FIG. 9.

In step S72, the regression model learning unit 63 compresses the parameters of the support vector regression model which is obtained using the learning. For example, as illustrated in FIG. 10, a large number of parameters in which $a_n$ and $a_n\sim$ are both zero occur in the parameters of the support vector regression model. Therefore, it is possible to compress the parameters by removing items in which $a_n$ and $a_n\sim$ are both zero, and making parameters in which $a_n$ and $a_n\sim$ are both not zero the transmission objects. In addition, in a case in which the parameters are obtained for each of the base stations, it is possible to compress the parameters by collecting only the parameters of the base stations which the user uses.

In step S73, the parameter transmission unit 64 transmits the updated parameters to the portable terminal 11 and ends the process.

Figure 13:
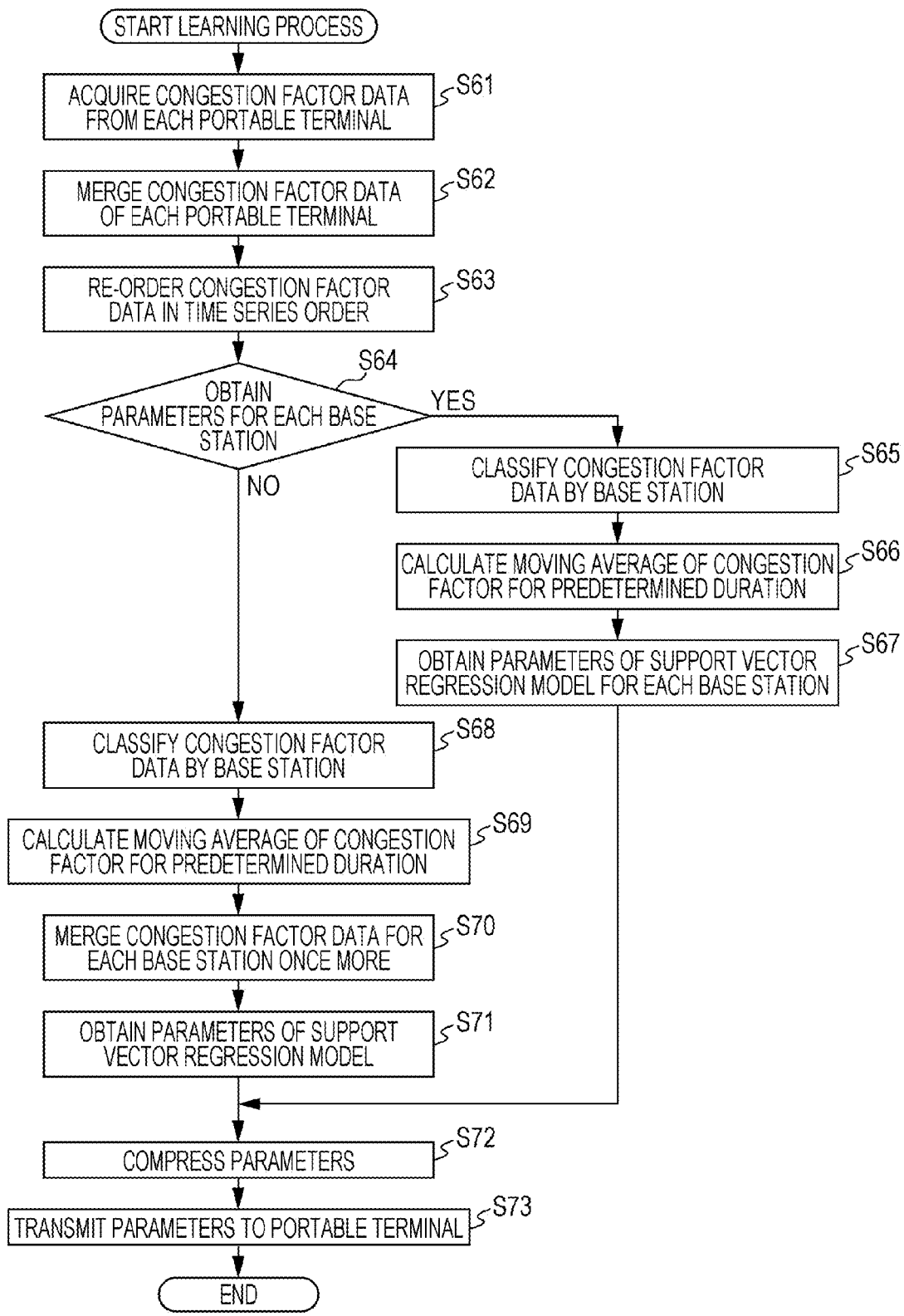
FIG. 13 is a flowchart illustrating the learning process in which the parameters of the support vector regression model are learned.

Furthermore, in FIG. 13, the reception of the congestion factor data (step S61), the data preprocessing and the parameter learning (steps S62 to S72), and the transmission of the parameters (step S73) are explained as a series of processes. However, since the reception of the congestion factor data and the transmission of the parameters are dependent upon the timing at which the portable terminals 11 connect, they are actually executed at separate timings.

In the process of FIG. 13, it is made possible to select whether to obtain the parameters of the support vector regression model for each of the base stations or to obtain the parameters for the entirety of the data for learning, however, it may also be made possible to only execute one or the other. In a case in which the parameters are to be obtained only as the entirety of the data for learning, it is possible to omit the item "base station ID" of the congestion factor data accumulated as the data for learning.

In addition, it is possible to accumulate the explanatory variable item "base station ID" of the congestion factor data as the coordinates of the base station by making at least one of the portable terminal 11 or the server 12 store a table in which the base station ID and the coordinates (location) of each of the base stations are stored. Using the "base station ID", the proximity (distance) of the base stations to each other is not evident, however, by using the coordinates of the base stations, it is possible to discover the proximity (distance) of the base stations to each other. Therefore, for example, in a case in which the estimation result estimating the congestion factor of the base station 13-4 is "congested", next, a process which estimates the congestion factor of the adjacent base stations 13-3 or 13-5 is possible.

Example of Prediction Result

Figure 14:
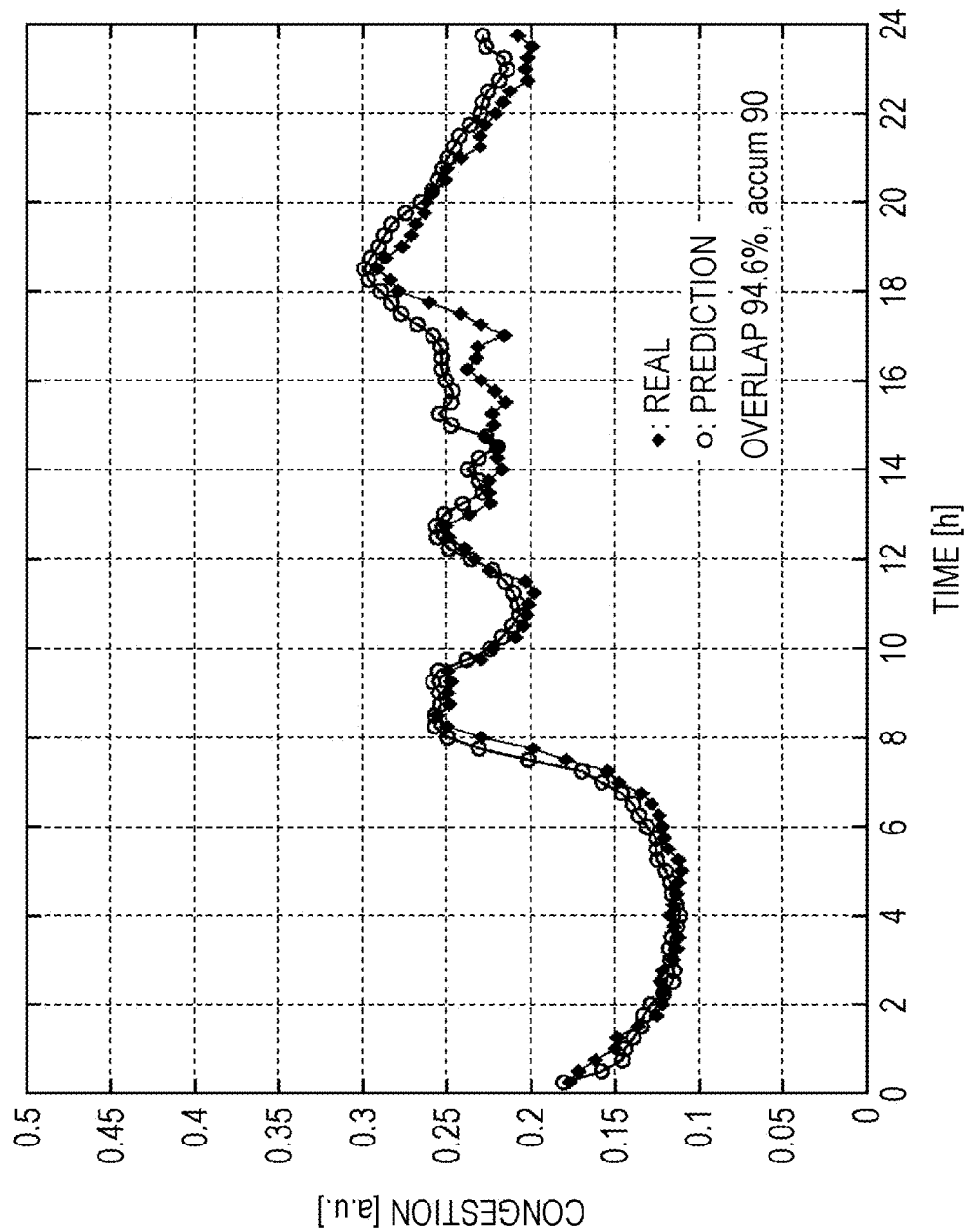
FIG. 14 is a view illustrating the prediction results obtained by predicting the congestion factor using the support vector regression model.
Figure 15:
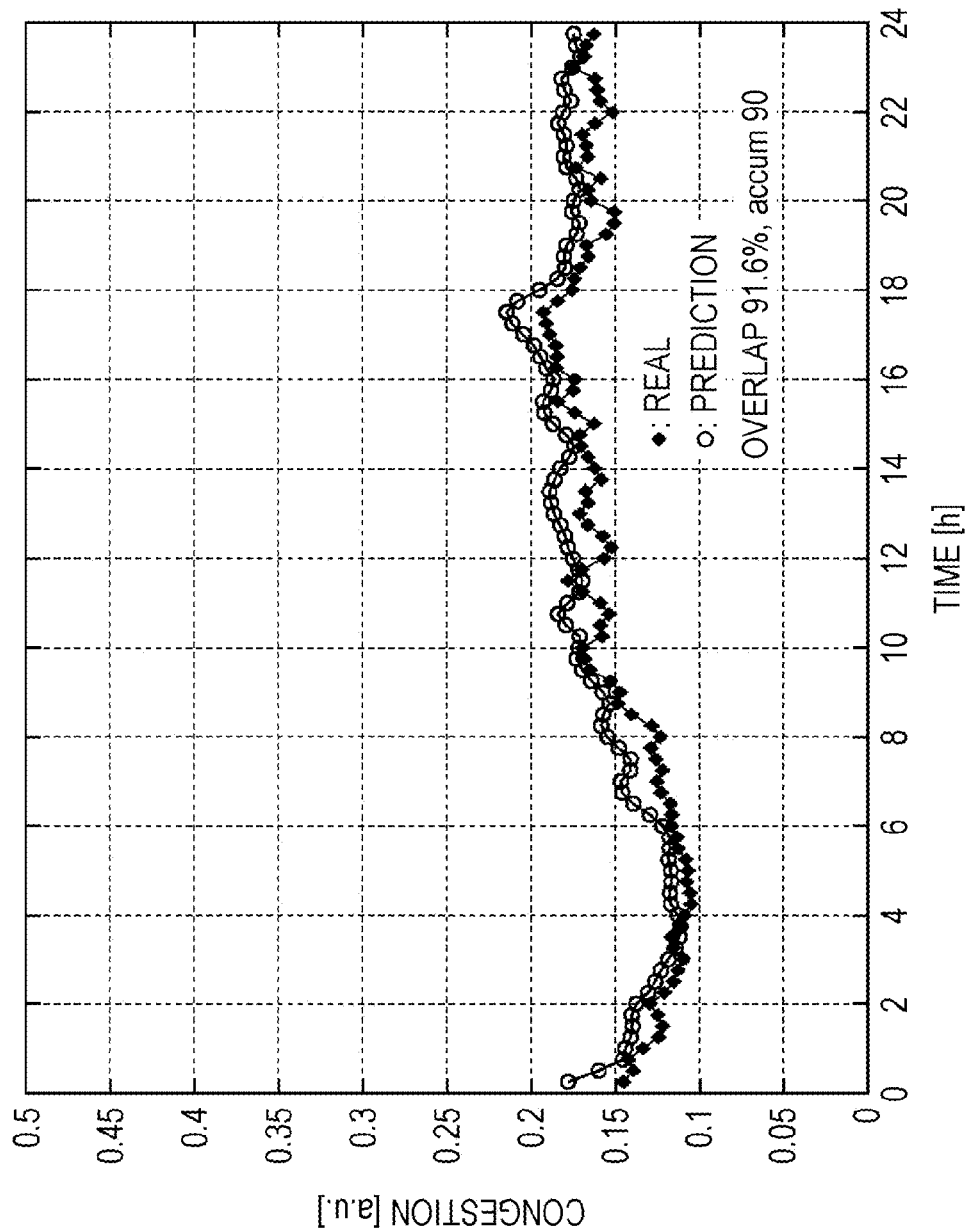
FIG. 15 is a view illustrating the prediction results obtained by predicting the congestion factor using the support vector regression model.
Figure 16:
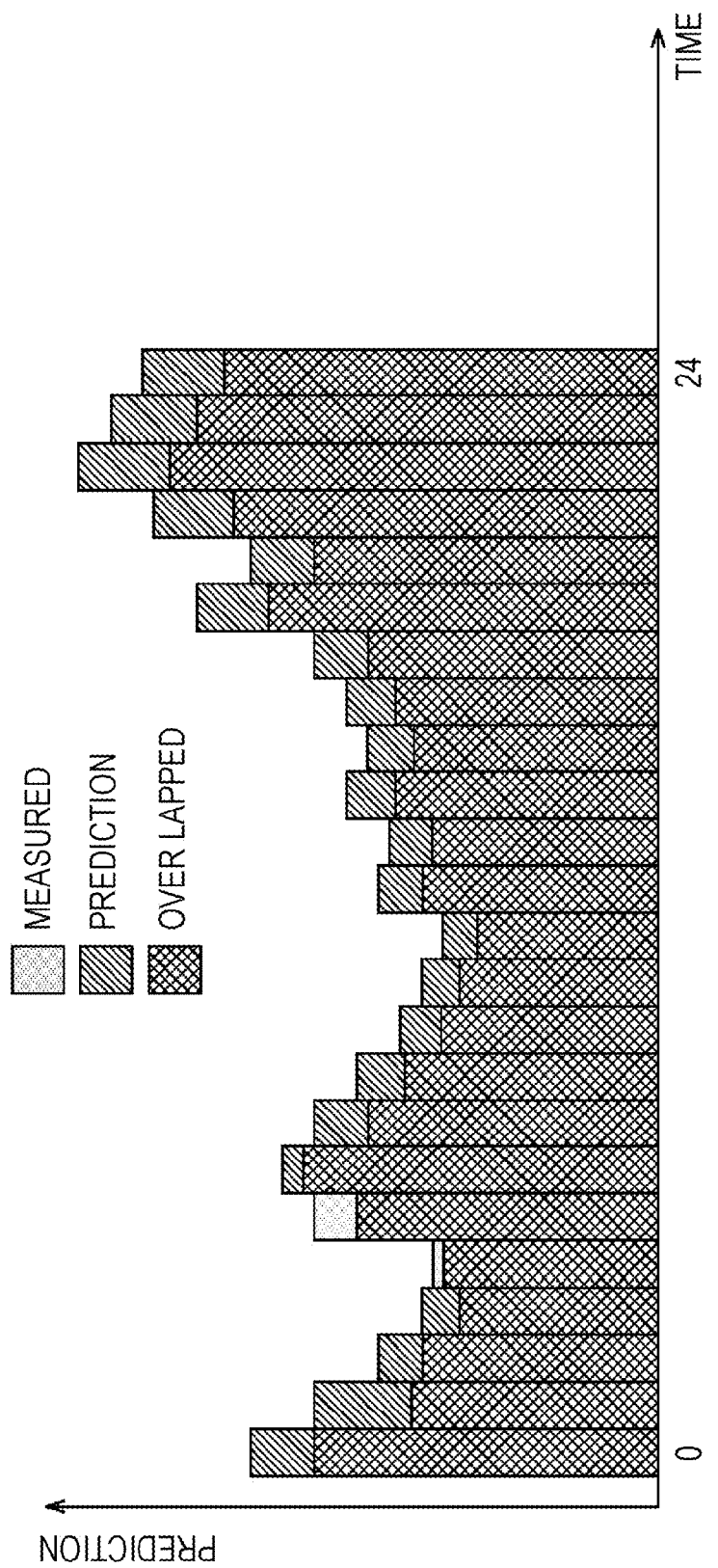
FIG. 16 is a view illustrating the prediction results obtained by predicting the congestion factor using the support vector regression model.

Description is given, with reference to FIG. 14 to FIG. 16, of the prediction results which predict the congestion factor using the support vector regression model.

FIG. 14 and FIG. 15 are each diagrams which superimpose and compare the measured value (Real) in which the congestion factor of a day is actually measured and the prediction value (Prediction) which is predicted using the support vector regression model. FIG. 14 shows the data of a day of a working day Friday, and FIG. 15 shows the data of a day of a non-working day Sunday. Furthermore, {"time", "day of the week", "working day or non-working day"} are included in the explanatory variable x of the support vector regression model.

As can be understood from comparing the measured values of FIG. 14 and FIG. 15, the pattern (trend) of the congestion factor differs between working days and non-working days, however, even when the pattern of the congestion factor differs in such a manner, it can be understood that the support vector regression model obtained through learning is a good representation of the measured values. In other words, the prediction value is a good representation of the measured value for both working days and non-working days.

FIG. 16 is a graph in which the degree of coincidence of the prediction values and the measured values has been calculated in units of one hour in relation to the working day of FIG. 14.

In FIG. 16, the degree of coincidence between the prediction value and the measured value is the value obtained by dividing the minimum value of the difference between the measured value and the prediction value by the maximum value of the difference between the measured value and the prediction value. In other words, the degree of coincidence is set to degree of coincidence=MIN (measured value, prediction value)/MAX (measured value, prediction value). According to this calculation method, the degree of coincidence is 100% if the measured value and the prediction value match, and when the measured value is greater than the prediction value and when the measured value is less than the prediction value, the degree of coincidence is less than 100%. Therefore, in a case in which the average is taken in units of one hour, units of one day, units of one month, or the like, even if the polarity of the error between the prediction value and the measured value differs, the values do not negate one another, and it is possible to evaluate the coincidence.

In relation to the working day of FIG. 14, the overlap, which is the average value of the degree of coincidence, is 94.6% as shown in FIG. 14, and the accum, which is the average value of the degree of coincidence over three months, is 90% as shown in FIG. 14.

In relation to the non-working day of FIG. 15, the overlap, which is the average value of the degree of coincidence, is 91.6% as shown in FIG. 15, and the accum, which is the average value of the degree of coincidence over three months, is 90% as shown in FIG. 15.

In this manner, even in a case in which the patterns (trends) of the congestion factor differ, as with working days and non-working days, the support vector regression model may be considered to predict the congestion factor with good accuracy.

Relational Vector Regression Model

Next, the relational vector regression model is described below.

The support vector regression may be typified in that a large number of parameters occur in which $a_n$ and $a_{n^{\sim}}$ are both zero, and in that it is possible to reduce the storage capacity of parameters. The relational vector regression model, as described below, makes it possible to reduce the number of parameters more than the support vector regression model.

In the relational vector regression, the expression which regresses the criterion variable y in relation to the explanatory variable x, in the same manner as in the support vector regression, may be represented using the following Expression (13).

$$y(x) = \sum_{n=1}^{N} w_n k(x, x_n) + b \quad (13)$$

Here, $k(x, x_n)$ is a kernel function, and is provided by Expression (7). In addition, b is a bias item, and is provided by Expression (9). In the same manner as in the case of the support vector regression, the explanatory variable x is the information of "time", "day of the week", "working day or non-working day", and "base station ID", and the criterion variable y(x) is the congestion factor.

In the support vector regression, as described above, a constraint, that is, a regularization is applied in order to avoid the weighting factor $w_m$ from becoming an extremely large value. Conversely, in the relational vector regression, the assumption that the weighting factor $w_m$ is a small value is applied by the prior distribution of the weighting factor $w_m$ in order to avoid the weighting factor $w_m$ from becoming an extremely large value. Therefore, it is necessary to handle the weighting factor $w_m$ statistically.

First, the likelihood of the criterion variable t occurring when the weighting factor vector w and the explanatory variable X are provided is considered. The likelihood p(t|X, w, β) of the learning data set is provided by the following Expression (14).

$$p(t \mid X, w, \beta) = \prod_{n=1}^{N} N(t_n \mid y(X_n, w), \beta^{-1}) \quad (14)$$

X of the left side of Expression (14) is a matrix in which N rows of the explanatory variable x of a D-dimensional vector among the learning data set are arranged. w of the left side of the expression is the vector of the weighting factor $w_m$. β is a positive real number, and t is the actual value (the measured value) of the criterion variable y(x). The right side of Expression (14) is an expression in which it is assumed that the actual value t of the learning data set will be generated according to a regular distribution having the same distribution independently for each item of congestion factor data, centered on the prediction value y(x). $N(t_n|y(X_n, w), \beta^{-1})$ is a regular distribution. $y(X_n, w)$ is calculated using Expression (13). $t_n$ is the criterion variable. In addition, $\beta^{-1}$ is the reciprocal of the distribution of the regular distribution noise.

The assumption that the value of the weighting factor vector $w_m$ will not become great is incorporated in the prior distribution below.

$$p(w \mid \alpha) = \prod_{n=1}^{N} N(w_n \mid 0, \alpha_n^{-1}) \quad (15)$$

In Expression (15), by assuming that the weighting factor $w_m$ is a value which is regularly distributed at a dispersion $\alpha_n^{-1}$ centered on 0, the assumption that the weighting factor $w_m$ is a small value is incorporated.

Using the above likelihood and prior distribution, it is possible to represent the latter distribution and the regular distribution of the weighting factor vector w, and to represent this as in Expression (16).

$$p(w|t,X,\alpha,\beta)=N(w|m,\Sigma) \quad (16)$$

The average m and the dispersion Σ of the weighting factor vector w of Expression (16) is provided by the following expression using the learning data set and α and β.

$$m=\beta\Sigma\phi^T t$$

$$\Sigma=(\text{diag}(\alpha_1 \ldots \alpha_m)+\beta\phi^T\phi)^{-1} \quad (17)$$

Here, φ is a kernel, $\phi_{nm}=k(x_n, x_m)$.

Therefore, if the parameters α and β are determined, the weighting factor vector w is unambiguously determined by the provided learning data set and the kernel $\phi(\phi_{nm}=k(x_n, x_m))$.

Therefore, finally, obtaining the parameters α and β is considered. The likelihood of the parameters α and β is obtained by performing marginalization on Expression (14) and Expression (15) in relation to the weighting factor vector w.

$$p(t|X,\alpha,\beta)=\int p(t|X,w,\beta)p(w|\alpha)dw \quad (18)$$

The values of the parameters α and β are obtained using maximum likelihood estimation, however, since α and β which maximize the likelihood of Expression (18) may not be directly obtained, they are obtained by performing a sequential estimation such as that below.

$$\alpha_n^{new} = \frac{1 - \alpha_n \sum_{nn}}{m_n^2} \quad (19)$$

-continued $$(\beta_n^{new})^{-1} = \frac{\|t - \phi_m\|^2}{N - \sum_{n=1}^{N}\left(1 - \alpha_n \Sigma_{nn}\right)}$$

m and Σ of Expression (19) are m and Σ of Expression (17) described above. The values of the parameters α and β are obtained by repeatedly performing the sequential estimation until the change of the likelihood satisfies a predetermined convergence condition.

When using the obtained α and β in the manner described above, the central value and the dispersion value of the weighting factor vector w may be obtained as in Expression (17). Finally, by substituting the value of the weighting factor vector w with the central value, it is possible to perform regression of Expression (13).

The learning process which obtains the values of the parameters α and β of the relational vector regression is the same as the process of FIG. 13 described above.

Figures 17, 18:
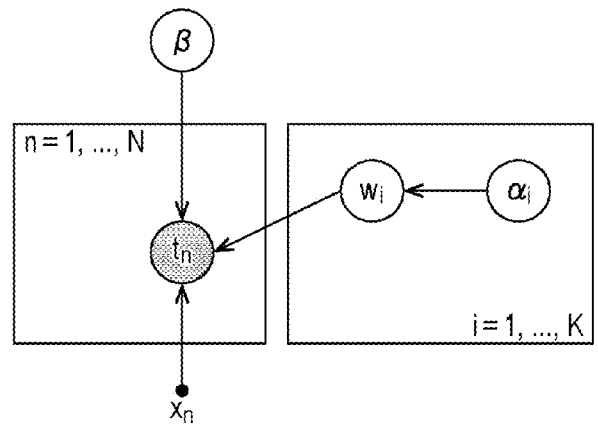
FIG. 17 is a view illustrating a relational vector regression model.
FIG. 18 is a view showing an example of the parameters m and $\Sigma$ of the relational vector regression model.

FIG. 17 is a graphical model of the relational vector regression.

The graphical model of FIG. 17 represents that, in the relational vector regression, the weighting factor $w_i$ (i=1, . . . , K) is a random variable, and is determined depending upon the parameter $\alpha_i$ (i=1, . . . , K). In addition, the graphical model represents that the measured value $t_n$ (n=1, . . . , N) of the criterion variable y(x) is determined by a combination of weighting factors $w_i$, the noise β, a predetermined basis function vector φ (not shown), and the explanatory variable x. As previously described, the kernel function k(x, $x_n$) may also be used as the basis function φ. In this case, K=N. Furthermore, by obtaining α and β through maximum likelihood estimation, the average $m_i$ and the dispersion $\Sigma_i$ of the weighting factor $w_i$ are obtained, and the prediction value y(x) of the measured value t in relation to the explanatory variable x is obtained using the average $m_i$ of the weighting factor $w_i$.

The graphical model of the relational vector regression is described in detail in "Variation Relevance Vector Machines" by C. M. Bishop and M. E. Tipping, published in "Uncertainty in artificial intelligence proceedings 2000", and the like.

FIG. 18 shows an example of the parameters m and Σ of the relational vector regression model obtained by learning.

In the relational vector regression model, the average $m_n$ and the dispersion $\Sigma_n$ of, instead of the weighting factor $w_m$ of Expression (1), the weighting factor $w_n$ of Expression (13) are stored in the regression model learning unit 63 as parameters. Furthermore, the dispersion $\Sigma_n$ of the weighting factor $w_n$ is necessary when one desires to know the accuracy of the scope or the like of the prediction, and as described above, may be omitted if only obtaining the prediction value y(x) of the measured value t in relation to the explanatory variable x. In FIG. 18, the explanatory variables $x_{n,1:D}$ and the criterion variable $t_n$ are stored as a set in the same manner as in the case of the support vector regression shown in FIG. 10.

From FIG. 18, for the parameters of the relational vector regression model, (3+D)×N parameters of the average $m_m$, the dispersion $\Sigma_n$, the explanatory variable $x_{n,1:D}$ (D dimensions), and the criterion variable $t_n$ are necessary. However, in the relational vector regression model, it is understood that there is a large number of parameters which are estimated to be of an extremely great value among the parameters $\alpha_n$ described above, and in $\alpha_n$ estimated to be of a great value, the average $m_n$ and the dispersion $\Sigma_n$ are zero. Therefore, by omitting the average $m_n$ and the dispersion $\Sigma_n$ which correspond to $\alpha_n$ which is estimated to be of a great value, it is possible to greatly reduce the number of parameters of the relational vector regression model.

Example of Prediction Result

Figure 19:
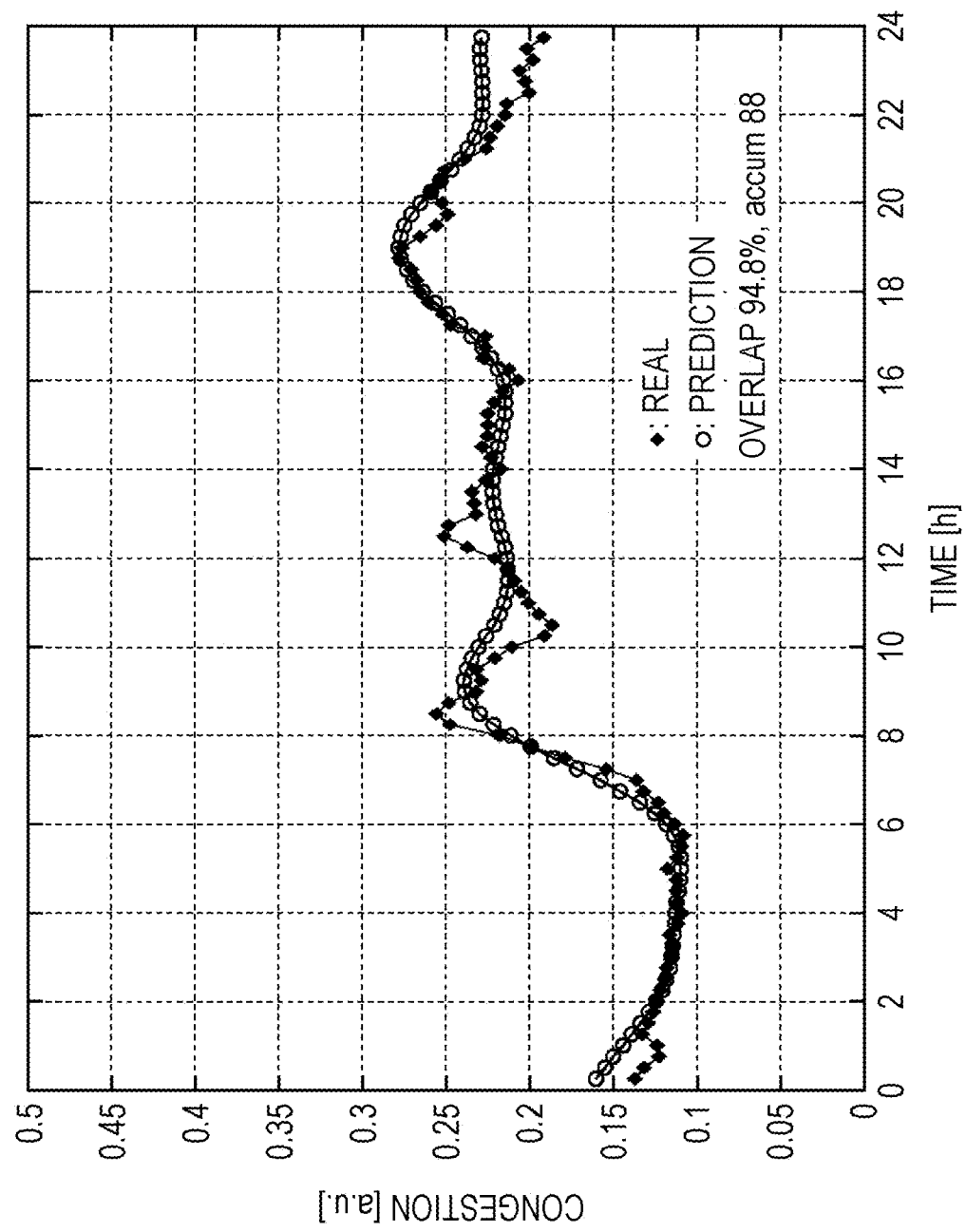
FIG. 19 is a view illustrating the prediction results obtained by predicting the congestion factor using the relational vector regression model.

FIG. 19 shows the prediction results which were obtained by predicting the congestion factor using the relational vector regression model.

FIG. 19 is a diagram which, in the same manner as FIG. 14 and FIG. 15 in the case of the support vector regression model, superimposes and compares the prediction value (Prediction), which is predicted using the relational vector regression model, and the measured value (Real) of the congestion factor of a day.

In relation to the working day of FIG. 19, the overlap, which is the average value of the degree of coincidence, is 94.8% as shown in FIG. 19, and the accum, which is the average value of the degree of coincidence over three months, is 88% as shown in FIG. 19.

Figure 20:
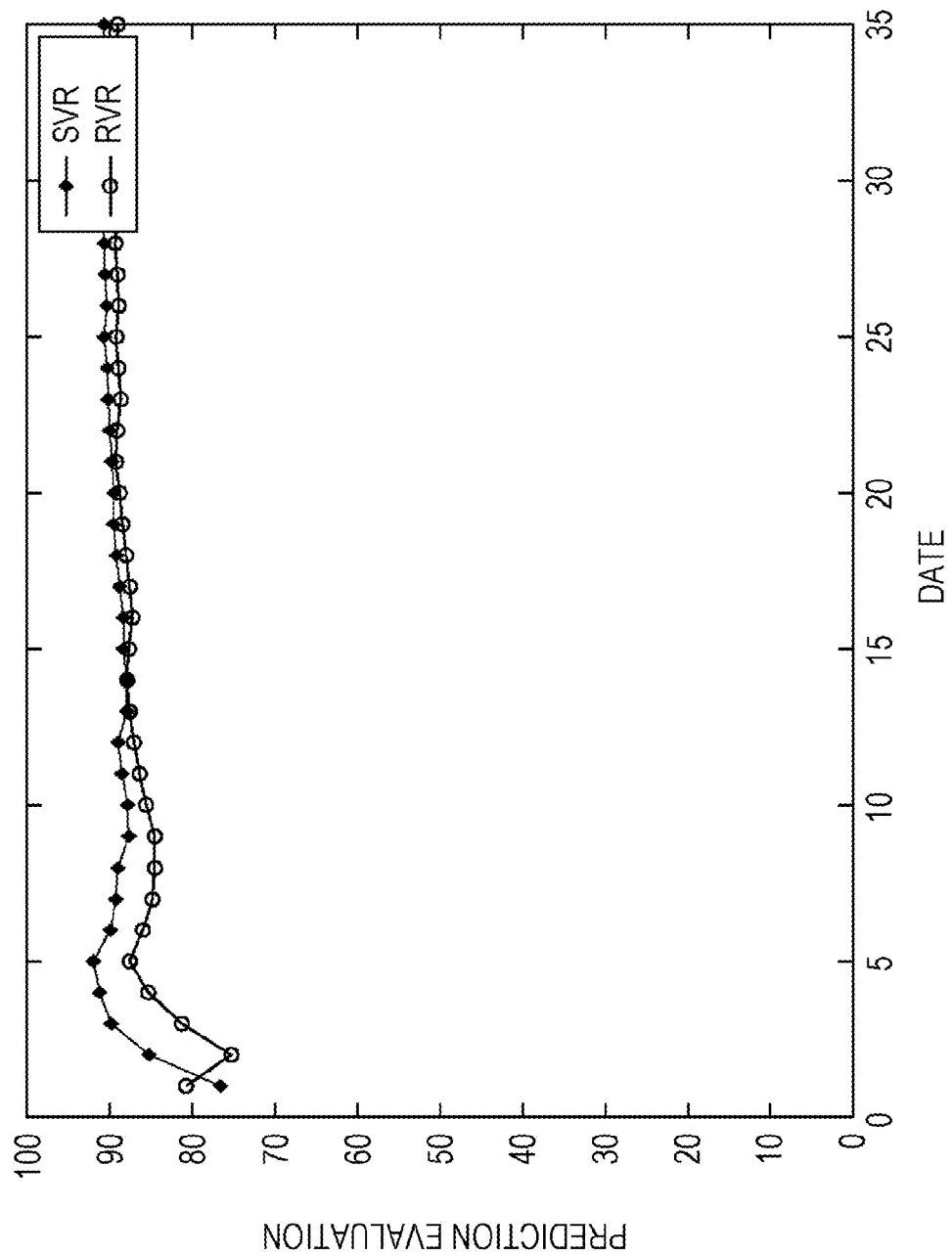
FIG. 20 is a view showing an example of the comparison results obtained by the comparing prediction performance of the support vector regression model and the relational vector regression model.

Comparative Example of Support Vector Regression Model and Relational Vector Regression Model FIG. 20 shows an example of the comparison results which were obtained by comparing the prediction performance of the support vector regression model and the relational vector regression model.

FIG. 20 shows the respective overlaps of the support vector regression model and the relational vector regression model which were measured from day one to day 35, with the horizontal axis as the date, and the vertical axis as the overlap. In FIG. 20, the polygonal line of black filled circles shows the overlap of the support vector regression model (SVR), and the polygonal line of white filled circles shows the overlap of the relational vector regression model.

From FIG. 20, after starting the measurement, it can be seen that the overlap of the relational vector regression model begins to stabilize at approximately the seventh day. In the support vector regression model and the relational vector regression model, the performance of the relational vector regression model is slightly inferior, however, from the 10th day onward the difference is less than 2%, which could be considered to be approximately no difference. Therefore, while dependant on whether or not a value of less than 2% is to be permitted, in a large number of applications, using the relational vector regression model is considered to be sufficient.

Figure 21:
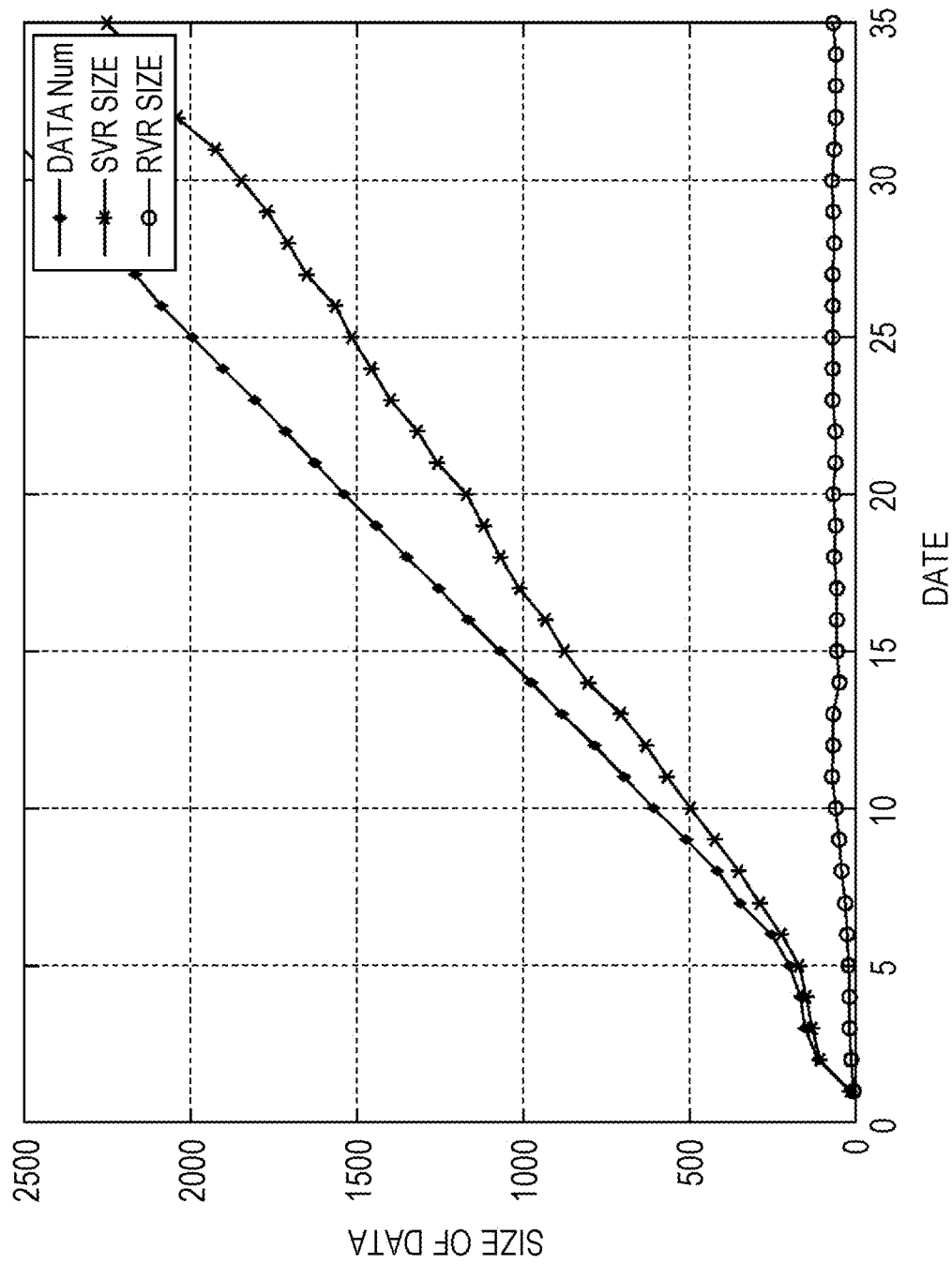
FIG. 21 is a view comparing the number of items of data of the support vector regression model and the relational vector regression model.

FIG. 21 compares the number of items of non-zero weighting data of the support vector regression model and the relational vector regression model.

FIG. 21 shows the history of the number of learning data sets, the number of items of data in which the weighting is not zero in the support vector regression, and the number of items of data in which the weighting is not zero in the relational vector regression.

In FIG. 21, the horizontal axis represents the number of days, and from the first day to the 35th day is shown. In addition, the vertical axis shows the number of items of data. Furthermore, the number of items of data of the 35th day crosses the margin, and there are approximately 3000 learning data sets, approximately 2200 support vector regression models, and approximately 60 relational vector regression models.

Referring to FIG. 21, among the learning data sets of which 3000 were collected over 35 days, in the support vector regression model, it is necessary to store 2200 items of data, however in the relational vector regression model, storing 60 items of data is sufficient. In addition, the number of items of data of the relational vector regression model barely changes from the 10th day onward. In this manner, even if the learning data sets increase, the number of items of data which are necessary for the relational vector regression model is extremely low. Therefore, modeling using the relational vector regression model is suitable for transmitting the learning data set to the portable terminals 11, and for performing the prediction process using the portable terminals 11 which have few calculation resources.

In the relational vector regression model, it is also possible to estimate the necessary data size.

When the number of items of congestion factor data to be collected is N, in accordance with explanatory variable: D (number of dimensions)×N, and criterion variable: 1×N, the number of items of data of the learning data set which are necessary is approximately (D+1)×N. Below, where D is "time", "day of the week", "working day or non-working day", D=3.

When the number of items of congestion factor data of a day is 10 per hour (6 minute interval) over 24 hours for one base station, the number of items of congestion factor data per day is 24×10=240. When data is collected at these conditions for one month (30 days), the total number of items of congestion factor data N is 240×30=7200. Therefore, the number of items of data of the learning data set is (D+1)×N=(3+1)×7200=28800. When each item of all of the data of the learning data set is stored in a data format of double precision (4 bytes), the necessary data size is 28800×4 B=115.2 kB. In other words, approximately 100 kB is necessary per month for each base station.

Conversely, in a case in which learning is performed using the relational vector regression model and the model parameters are used, from the results of FIG. 21, the total number of items of congestion factor data N to store is 60/3000=1/50, therefore 7200/50=144 items are sufficient. Furthermore, the number of parameters per item of congestion factor data which are necessary is explanatory variables D=3, criterion variables 1, and weighting averages 1, which is D+2, therefore 144×5=720 items of data are to be stored. As a result, the necessary data size is 720×4 B=2.9 kB. Therefore, according to the relational vector regression model, it is possible to compress an amount of approximately 100 kB of data into approximately 2.9 kB. Furthermore, for example, even if the data of 1000 base stations were to be collected, in the relational vector regression model, prediction is possible using a database of 2.9 MB.

Application Examples

Surrounding Base Station Information Application

In the description above, description is given of an example in which, in the portable terminal 11, the user specifies the base station 13 for which they wish to know the congestion factor and the prediction unit 45 predicts and outputs the congestion factor of the specified base station 13 using a regression model.

However, the index "congestion factor" is not easy to understand for a user. In addition, when the congestion factor of the host cell 13 is high, it would be convenient for the user if a replacement base station 13 could be presented.

Therefore, an application may be considered which, instead of presenting the index "congestion factor" of the host cell 13, presents the "communication rate", and presents the "communication rate" of the surrounding base stations 13 of the host cell 13 and the distance to or from the coverage area (or, the distance expected until a hand-over is performed and the base station 13 becomes the host cell 13).

Figure 22:
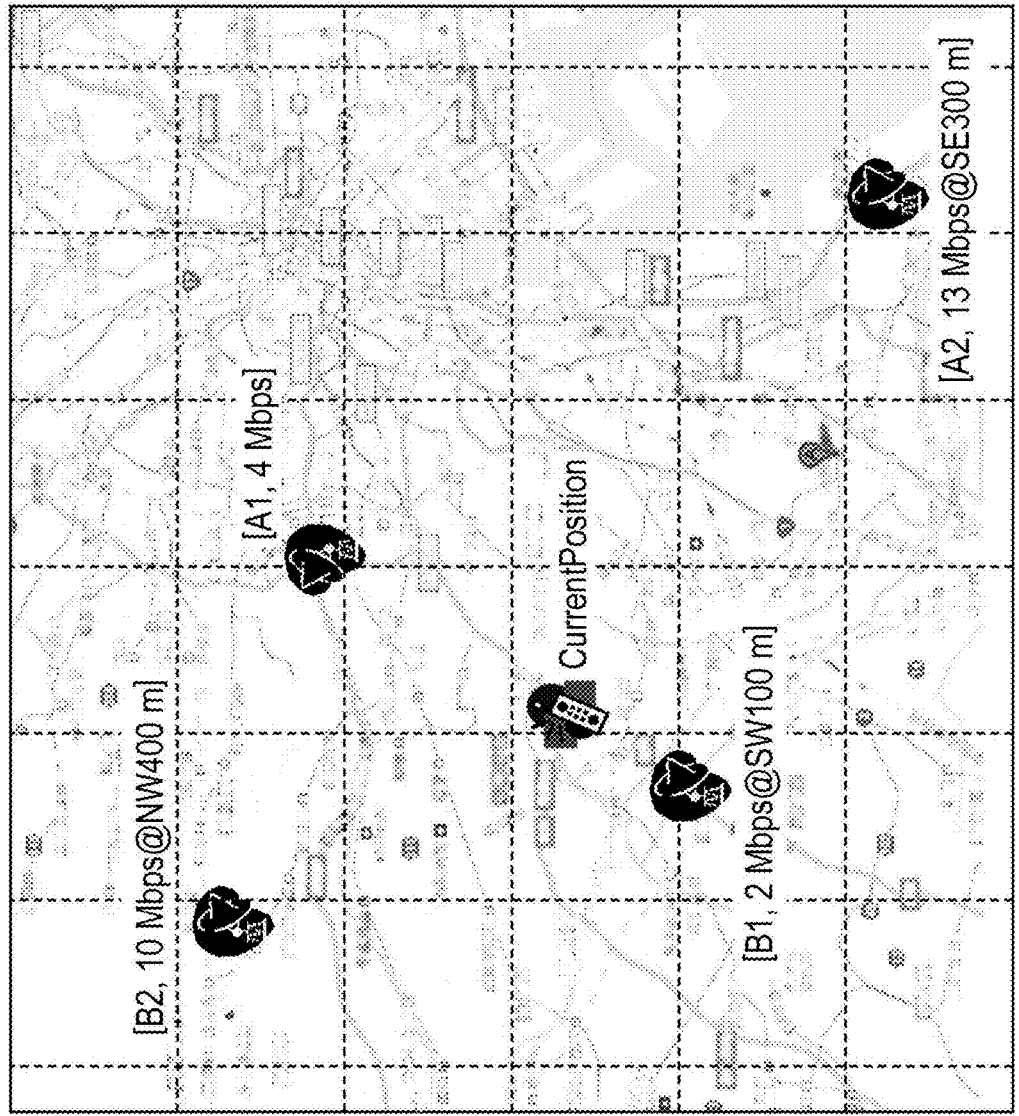
FIG. 22 is a view showing an example of the prediction results screen.

FIG. 22 shows an example of the prediction result screen displayed on the display unit 47 of the portable terminal 11 using such an application.

In FIG. 22, "CurrentPosition" represents the present location of the portable terminal 11 of the user, and the base station 13 represented by [A1, 4 Mbps] is the host cell 13 corresponding to the present location. [A1, 4 Mbps] is the base station 13 of the telecommunications carrier A, and shows that the present communication rate is 4 Mbps.

As base stations 13 other than the host cell 13 in relation to the present location of the portable terminal 11, the three base stations 13 [B2, 10 Mbps@NW400 m], [B1, 2 Mbps@SW100 m], and [A2, 13 Mbps@SE300 m] are present.

The base station 13 represented by [B2, 10 Mbps@NW400 m] is the base station 13 of the telecommunications carrier B, the distance to or from the coverage area thereof is 400 m North-West (NW), and the communication rate is 10 Mbps. The base station 13 represented by [B1, 2 Mbps@SW100 m] is the base station 13 of the telecommunications carrier B, the distance to or from the coverage area thereof is 100 m South-West (SW), and the communication rate is 2 Mbps. In addition, the base station 13 represented by [A2, 13 Mbps@SE300 m] is the base station 13 of the telecommunications carrier A, the distance until the coverage area thereof is 300 m South-East (SE), and the communication rate is 13 Mbps.

The surrounding base stations 13 with respect to the host cell 13, may, for example, be recognized by maintaining a table which stores the surrounding base stations 13 for each of the base stations 13. In addition, in a case in which each of the base stations 13 is stored by the coordinates (position) and not by the base station ID, the position information thereof may be used. In addition, it is possible to estimate the communication rate by using the congestion factor of the base station 13, the SIR (Signal to Interference Ratio) and the diffusion coefficient or the like of a pilot signal. The calculation method of the communication rate is disclosed in Japanese Unexamined Patent Application Publication No. 2012-9987 described above.

As described above, according to the application, it is possible to predict and display how much the communication rate will be changed depending on which way and how far the user moves. In addition, it is possible to perform a control such as switching between the base stations 13 or the telecommunications providers based on the prediction results.

Furthermore, the method of providing the information such as the communication rate and the coverage area of the base stations 13 is not limited to the method of FIG. 22 in which the information is displayed on a map, and a method of simply listing the information up, or a method of providing the information using audio guidance may be arbitrarily used. In addition, such an application may also be embedded as a portion of another application.

Application Linked with Movement Prediction Function

Description is given below of other application examples.

In Japanese Unexamined Patent Application Publication No. 2011-059924, Japanese Unexamined Patent Application Publication No. 2011-252844 and the like, the present applicant has proposed techniques of predicting the movement route and the destination of the user based on the learning results obtained by learning the movement route and the destination of the user using a predetermined learning model. By linking this movement prediction function and the congestion factor prediction function in relation to a predetermined time and position, which is proposed in the present specification, it is possible to realize an application which predicts the congestion factor of the base stations 13 to which may be connected using the predicted movement route and destination and appropriately selects the host cell 13.

In the movement prediction function proposed in Japanese Unexamined Patent Application Publication No. 2011-059924, Japanese Unexamined Patent Application Publication No. 2011-252844 and the like, the hidden Markov model has been adopted as the learning model to learn the movement route and the destination of the user. Therefore, a simple description is given of the hidden Markov model.

Figure 23:
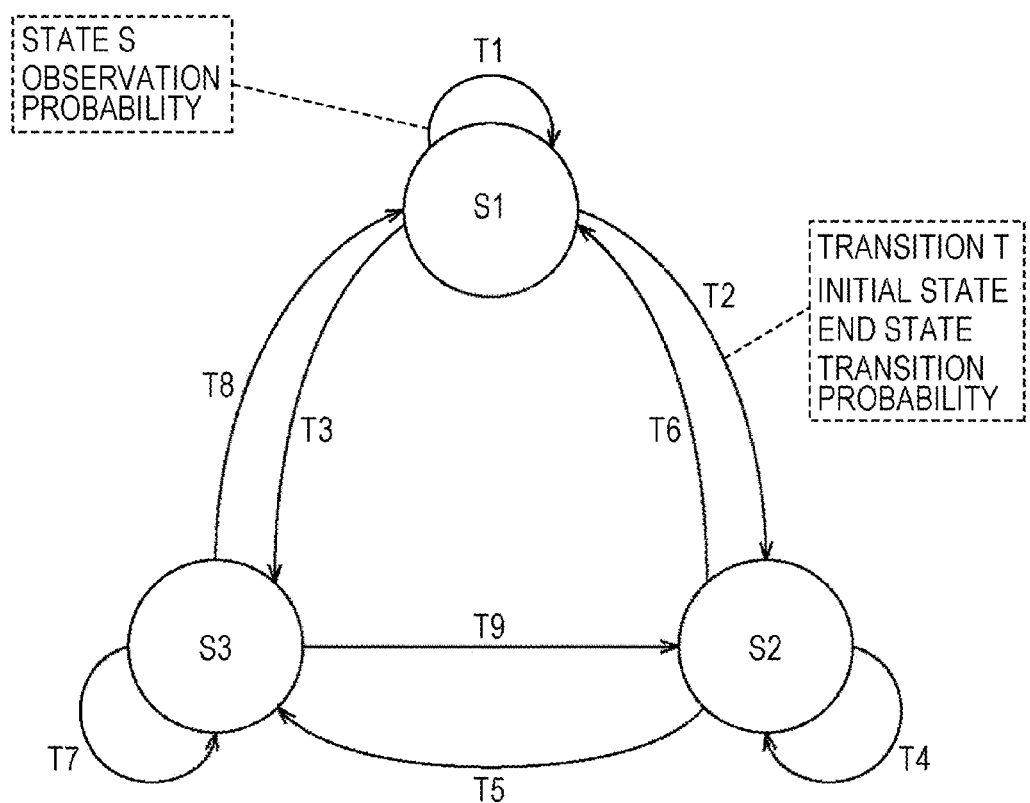
FIG. 23 is a diagram illustrating the hidden Markov model.

FIG. 23 shows a state transition diagram of the hidden Markov model.

The hidden Markov model is a probability model which models time series data using the transition probability and the observation probability of states in hidden layers. In a case of a learning model in which the movement route and the destination of the user are learned, the data which represents the movement history of the user obtained using a GPS sensor or the like is time series data for learning. The hidden Markov model is described in detail in, for example, "Algorithms of Pattern Recognition and Learning" by Yoshinori UESAKA and Kazuhiko OZEKI, Bun-ichi Co., Ltd, and "Pattern Recognition and Machine Learning" by C. M. Bishop, Springer Japan KK.

FIG. 23 shows three states of state S1, state S2 and state S3, and nine transitions T of transition T1 to T9. Each of the transitions T is defined by three parameters, an initial state which represents the state before transition, an end state which represents the state after transition, and a transition probability which represents the probability of transition from the initial state to the end state. In addition, each of the states have an observation probability, which represents the probability of each symbol being selected, as a parameter, in assumption that any one of discrete symbols whose data is predetermined will be selected.

Figure 24:
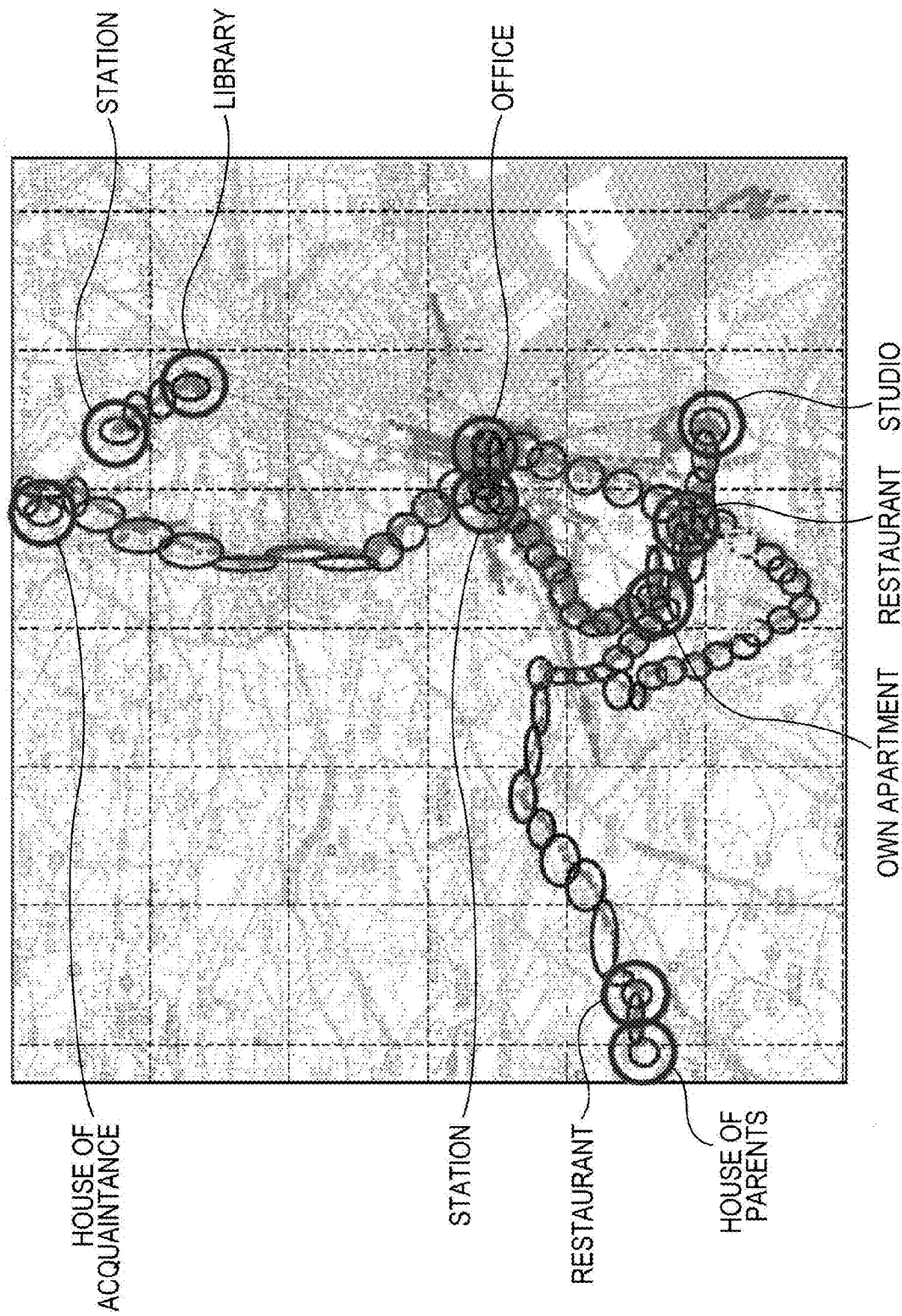
FIG. 24 is a view showing the learning results of the movement history of the user.

FIG. 24 shows the learning results obtained by learning the movement history of the user using the hidden Markov model.

In FIG. 24, the data for learning is the past movement history of the user, and is time series data of the time, latitude and longitude which were measured by the GPS sensor when the user moved in the past. In addition, in FIG. 24, each of the plurality of ovals, which is arranged so as to cover the movement route, represents the contour lines of the probability distribution of the measured data generated from the state of the hidden Markov model. In addition, in FIG. 24, in order to facilitate understanding, the destination of the user when the data for learning is recorded is clearly marked using a circle slightly larger than the ovals.

The central values and the dispersion values of the states which correspond to each of the plurality of ovals shown in FIG. 24 are learned as the parameters of the hidden Markov model. In addition, the transition probabilities between the states which correspond to each of the plurality of ovals shown in FIG. 24 are also learned as the parameters of the hidden Markov model. For the destination, the state nodes in which the sojourn time is long, among the plurality of states of the hidden Markov model obtained by learning, is set as the destination node.

Figure 25:
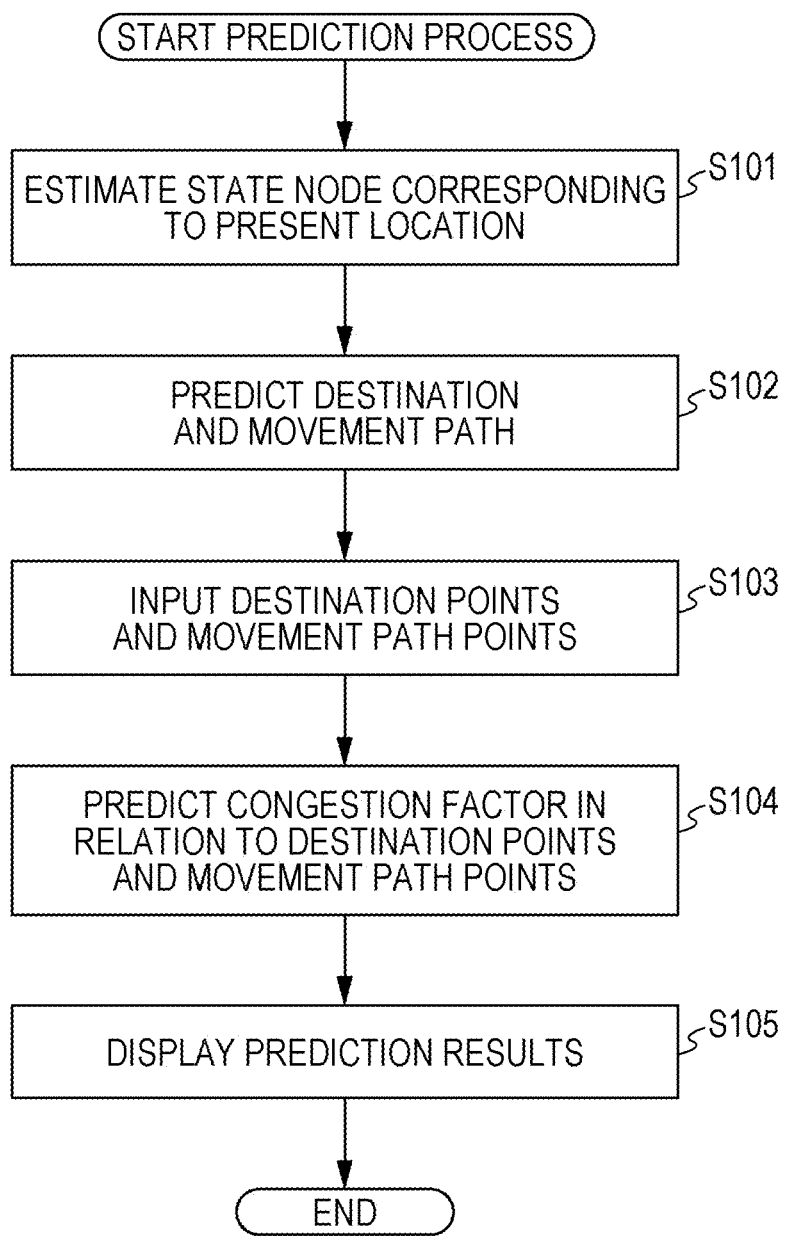
FIG. 25 is a flowchart of the prediction process in which the congestion factor is predicted by predicting the movement route and the destination.

Prediction Process in which Congestion Factor is Predicted by Predicting Movement Route and Destination FIG. 25 is a flowchart of the prediction process executed by an application linked with the movement prediction function, in which the movement route and the destination are predicted, and thus the congestion factor is predicted according to the prediction results. In FIG. 25, the application linked with the movement prediction function is performed by the prediction unit 45 of the portable terminal 11, and the prediction unit 45 is described as having a movement prediction unit which executes the movement prediction function, and a congestion factor prediction unit which performs prediction of the congestion factor.

First, as step S101, the movement prediction unit of the prediction unit 45 acquires the present location using a GPS sensor or the like, and estimates the state node of the hidden Markov model corresponding to the present location.

In step S102, the movement prediction unit of the prediction unit 45 predicts the destination to which the user will move from the present location, and the movement route thereto. The movement prediction unit tree searches the state transition diagram which extends from the state node of the present location to search for the destination node corresponding to the destination, using the hidden Markov model obtained by learning. There are also cases in which a plurality of destinations and movement routes thereto are detected. For example, the movement prediction unit lists up a predetermined number of the destinations in order of highest arrival probability to the destination, and determines the route with the highest occurrence probability among the routes which lead to the destination as the representative route.

In step S103, the movement prediction unit of the prediction unit 45 inputs to the congestion factor prediction unit of the prediction unit 45, the destination point of the predicted destination and the specified points on the map of the movement route thereto as the movement route points. The destination point is provided by the central value which is a state parameter of the destination node, and it is possible, for example, to provide the movement route points by the central values of the state nodes which represent each section formed when partitioning the movement route by a fixed time or into fixed sections. In addition, since the movement prediction unit, in addition to the destination and the movement route, may also predict the arrival time (scheduled arrival time) of when each of the state nodes arrives, the time is also input to the congestion factor prediction unit along with the destination point and the movement route points.

In step S104, the congestion factor prediction unit of the prediction unit 45 predicts the destination points and the movement route points in the input time. Furthermore, in step S105, the congestion factor prediction unit displays the prediction results on the display unit 47 and ends the process.

It is possible to predict the congestion factor of the base stations 13 to which may be connected in relation to the predicted movement route and destination by linking the movement prediction function and the congestion factor prediction function. Furthermore, in the process of FIG. 25, the points of the destination and the movement route were obtained at the same time, however, at least one of the destinations and the movement routes which are possible to arrive at within a predetermined time from the present time may also be obtained. In addition, using the congestion factor which is predicted according to the movement destination, it is naturally also possible to select the base station 13 to connect to. The movement prediction function is described in detail by the present applicant in Japanese Unexamined Patent Application Publication No. 2011-059924, Japanese Unexamined Patent Application Publication No. 2011-252844, and the like.

Figure 26:
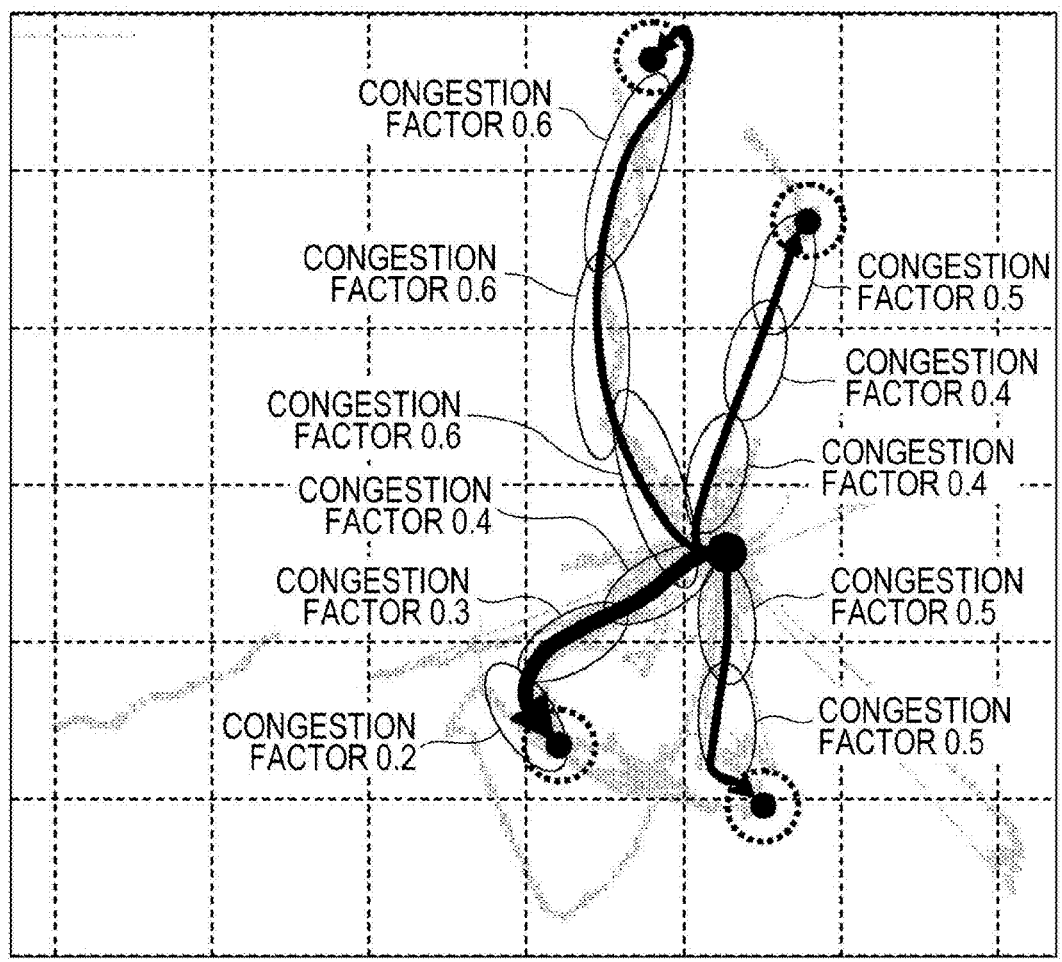
FIG. 26 is a view showing an example of the prediction results obtained using the prediction process.
Figure 27:
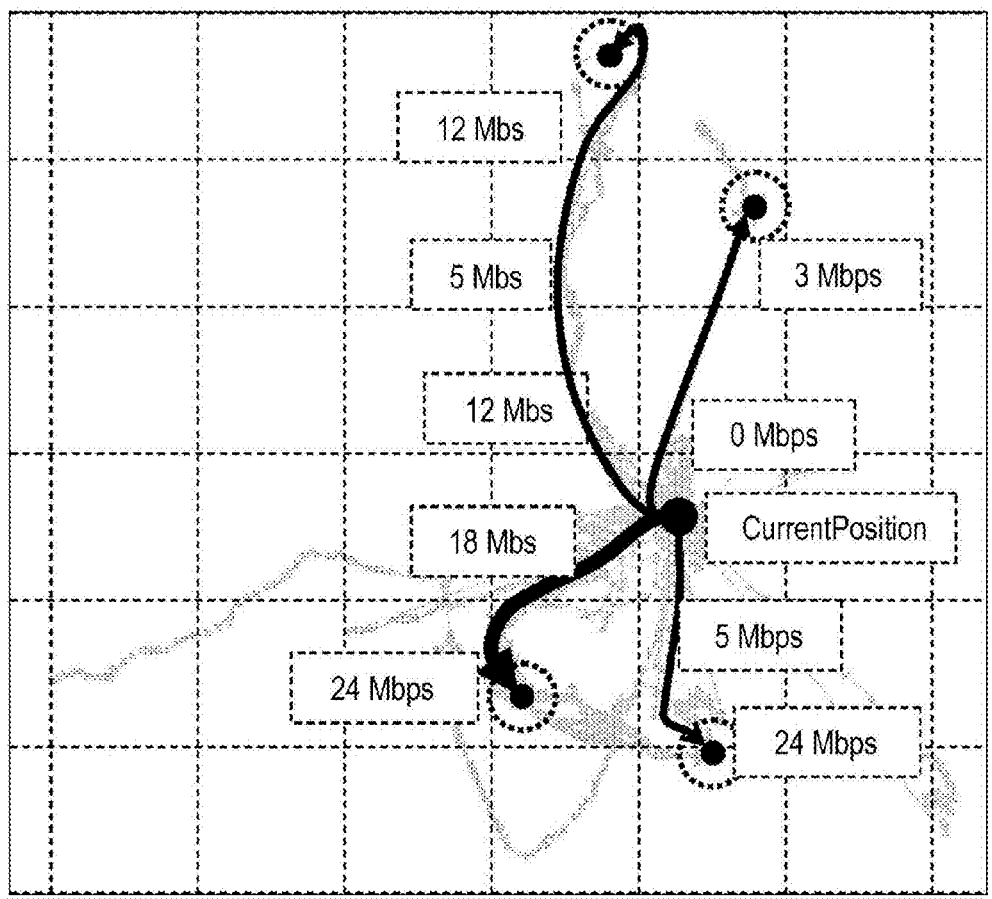
FIG. 27 is a view showing an example of the prediction results obtained using the prediction process.

FIG. 26 shows an example of the prediction results of the prediction process described in FIG. 25. In addition, FIG. 27 shows the prediction results shown by the communication rate which is obtained from the congestion factor obtained by estimation. Furthermore, there is no relationship between the prediction results of FIGS. 26 and 27.

Figure 28:
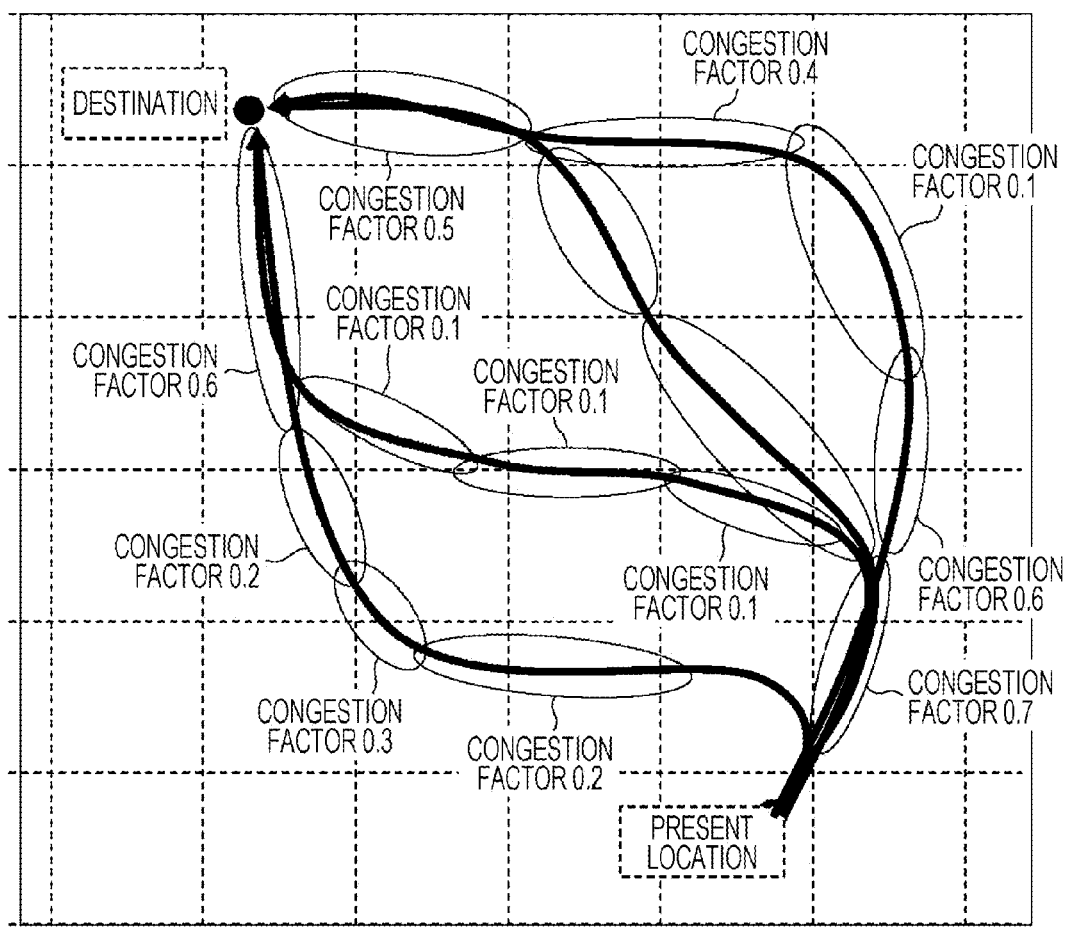
FIG. 28 is a view showing an example of the prediction results obtained using the prediction process.

FIGS. 26 and 27 are examples in which one movement route is extracted in relation to one destination, however, FIG. 28 shows an example in which a plurality of routes are extracted in relation to one destination so as to display the congestion factor for each of the extracted routes.

Application Example of Information Other than Congestion Factor

In the embodiments described above, description is given of an example in which the congestion factor of base stations 13 which are separated chronologically or spatially is predicted (estimated) by learning with a regression model using the congestion factor data of the base stations 13.

However, the present technology is not limited to the information such as the congestion factor, and it is possible to apply the present technology to prediction processes in general which predicts local information obtained at chronologically or spatially separated positions from local information obtained at the present point in time or the present position.

For example, the portable terminal 11 has sensors such as a thermometer, a hygrometer, or a barometer mounted thereto, and the acquisition unit (equivalent to the congestion factor acquisition unit 41) acquires the temperature, humidity, atmospheric pressure and the like obtained by the sensors as local information, transmits the time series data of the measurement results to the server 12, and causes the server 12 to learn it using the regression model. Furthermore, the prediction unit 45 of the portable terminal 11 acquires the learning results (the parameters of the regression model), and then it is possible to predict the temperature, the humidity, the atmospheric pressure and the like of a future time or at different locations as local information.

In addition, the portable terminal 11 may have an illuminometer and a microphone mounted thereto, and the human activities of the surroundings (activity conditions of human activity such as traffic conditions, noise conditions, and the brightness of the town) may be measured as the local information and learned by the regression model.

Furthermore, the local information acquired by the portable terminal 11 is not limited to that acquired using sensors or the like mounted within the device, and may also be acquired by a method in which the user inputs the local information using a GUI or the like.

Figure 29:
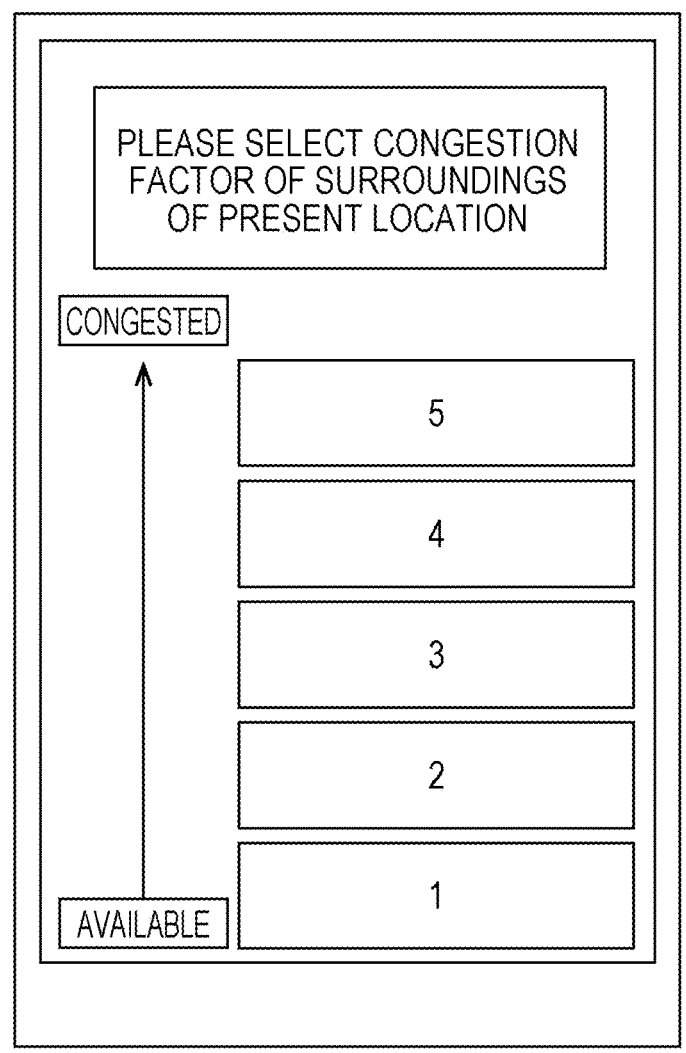
FIG. 29 is a view showing an example of the input screen for inputting the local information.

FIG. 29 shows an example of the user inputting the congestion factor of the surroundings of the user's present location as an example of the local information acquired by the method of a user performing input.

FIG. 29 shows an example of the screen displayed on the display unit 47 of the portable terminal 11, and the user inputs the congestion factor of the surroundings of the user's present location using a five stage evaluation. The portable terminal 11 records the congestion factor input using the five stage evaluation along with the location and the time, and transmits this to the server 12.

Figure 30:
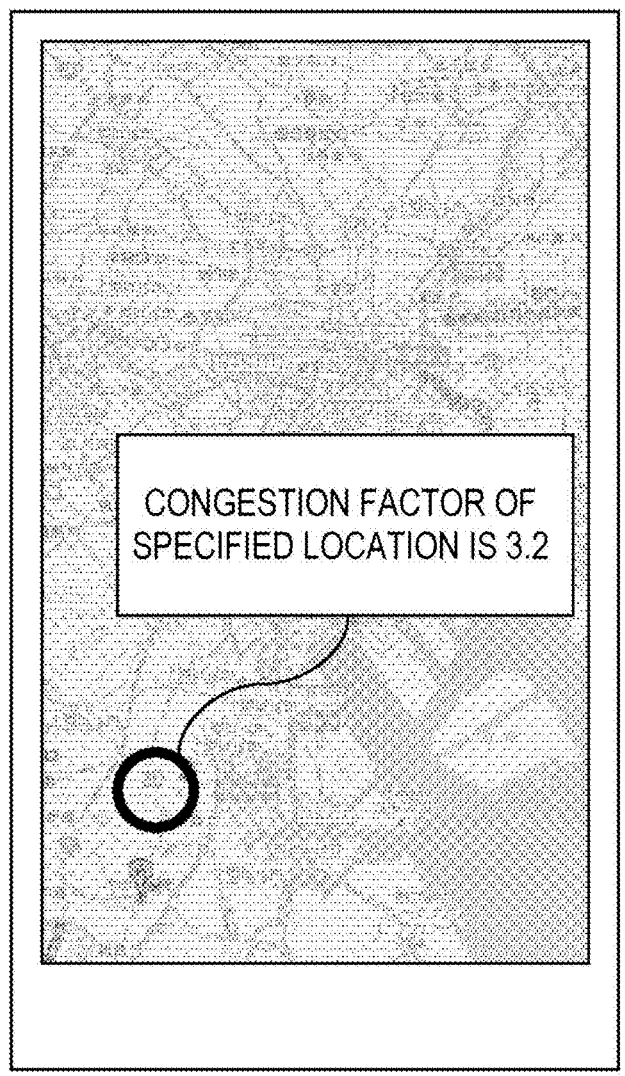
FIG. 30 is a view showing an example of the prediction results screen on which the local information is predicted.

FIG. 30 shows an example of the screen of the prediction results which predict the congestion factor of a predetermined location by using a regression model which is learned from the local information shown in FIG. 29.

For example, when the user touches the location for which they desire to know the congestion factor on the map displayed on the screen, as shown in FIG. 30, the prediction results are displayed in a manner such as "the congestion factor of the specified location is 3.2".

Furthermore, for the local information that the user inputs, various information other than the congestion factor can also be considered. For example, the male to female ratio, the age groups and the like in the present location (local area) may also be input as the local information. In the screen such as that shown in FIG. 29, it is possible to present the male to female ratio as a five stage evaluation such as 1. male male male, 2. male male female, 3. male female, 4. female female male, 5. female female female, and the like and allow the user to perform input. In addition, for example, it is possible to allow the user to input the age band by presenting the user with a five stage evaluation such as 1. 70 or older, 2. 50 to 70, 3. 35 to 50, 4. 20 to 35, and 5. 0 to 20. Additionally, the degree of activity of the town (a time slot in which the town in bright, a time slot in which the shops close) or the like, or the ratio of the types of vehicle on the roads (are there more trucks, domestic vehicles, busses, or taxies) or the like can also be considered as local information which may be input. The local information exemplified herein is only an example, and the local information is not limited thereto.

Such local information may be the motivation for the future actions of the user, and alternatively, is important for displaying appropriate advertising adapted to the subject. In the related art, in order to collect such local information, surveys were performed using manpower. However, it is anticipated that such surveys will become more difficult as the desired information is subdivided. By using a method such as that described in the present specification, it is possible to predict arbitrary local information in addition to easily collect local information.

Each of the plurality of the portable terminals 11 acquire different items of local information at different times and transmit them to the server 12, and the server 12 learns the local information collected by the large number of portable terminals 11 as crowd sourced knowledge using the regression model. It is possible for the portable terminal 11 which receives and uses the model parameters which are learned by the server 12 to predict the local information of a location at which the portable terminal 11 itself has not acquired, or of a future time.

In addition, the server 12 learns (the time series data of) the local information which is collected by a large number of the portable terminals 11 by using the support vector regression model or the relational vector regression model, and it is therefore possible to reduce the capacity of the parameters and transmit the model parameters to each of the portable terminals 11. Therefore, it is possible for each of the portable terminals 11 to efficiently use the local information collected by a large number of the portable terminals 11.

In the examples described above, the portable terminal 11 receives the parameters of the regression model and predicts the local information, however, the estimation of the local information may also be performed by the server 12. In other words, a configuration may be adopted such that the portable terminal 11 transmits the time and the location to be predicted to the server 12, and the server 12 predicts the local information of the time and the location which were transmitted thereto using a regression model and transmits the prediction results to the portable terminal 11.

Configuration Example of Computer

The series of processes described above may be executed using hardware and may also be executed using software. In a case in which the series of processes is executed using software, the program configuring the software is installed on a computer. Here, the computer includes a computer embedded within dedicated hardware, and an ordinary personal computer or the like which is capable of executing the various functions due to having various programs installed thereon.

FIG. 31 is a block diagram showing a configuration example of the hardware of the computer which executes the series of processes described above using a program.

In the computer, a CPU (Central Processing Unit) 101, ROM (Read Only Memory) 102, and RAM (Random Access Memory) 103 are connected to one another by a BUS 104.

An input-output interface 105 is further connected to the bus 104. The input-output interface 105 is connected to an input unit 106, an output unit 107, a storage unit 108, a communication unit 109, and a drive 110.

The input unit 106 is formed from a keyboard, a mouse, a microphone, and the like. The output unit 107 is formed from a display, a speaker, and the like. The storage unit 108 is formed from a hard disk or volatile memory, and the like. The communication unit 109 is formed from a communication module or the like which performs communication with other communications equipment or the base station via the internet, a portable phone network, a wireless LAN, a satellite broadcast line, or the like. A sensor 112 is a sensor for acquiring the local information. The drive 110 drives a removable storage medium 111 such as a magnetic disk, an optical disk, a magneto-optical disk, or semiconductor memory.

In the computer configured as described above, the series of processes described above are performed by the CPU 101, for example, loading the program stored in the storage unit 108 into the RAM 103 via the input-output interface 105 and the bus 104, and executing the loaded program.

In the computer, it is possible to install the program into the storage unit 108 via the input-output interface 105 by mounting the removable recording medium 111 into the drive 110. In addition, it is possible to install the program to the storage unit 108 by receiving the program using the communication unit 109 via a wired or wireless transmission medium such as the local area network, the Internet, or a digital satellite broadcast. Additionally, it is possible to install the program beforehand on the ROM 102 or the storage unit 108.

Furthermore, in the present specification, the steps described in the flowchart may naturally be performed in the described order in a time series manner, and even if the steps are not necessarily processed in time series order, they may be executed at the necessary timing such as in parallel or when the step is called.

Furthermore, in the present specification, the term "system" refers to the entirety of a device which is configured of a plurality of devices.

The embodiments of the present technology are not limited to the embodiment described above, and various modifications may be made within the scope not departing from the spirit of the present technology.

Furthermore, the present technology may adopt configurations such as the following.

(1) A terminal device includes an acquisition unit which acquires local information of a present location at a present time; an accumulation unit which accumulates the acquired local information for a predetermined period; a communication unit which transmits the local information which is accumulated for a predetermined period to an information processing device, and receives parameters of a statistical model which are learned using the local information, which is acquired using the information processing device from a plurality of terminal devices, from the information processing device; and a prediction unit which predicts the local information in relation to an arbitrary time and location using the received parameters of the statistical model.

(2) The terminal device according to (1), in which the statistical model is a regression model in which at least a time and an area are explanatory variables, and items of local information are criterion variables.

(3) The terminal device according to (2), in which the communication unit receives only the parameters in which the weighting parameter is not zero, of weighting parameters of the regression model.

(4) The terminal device according to any of (1) to (3), in which the local information is information representing a congestion factor of a base station to which the terminal device is connected in order to perform communication.

(5) The terminal device according to any of (1) to (4), in which the prediction unit predicts the local information in relation to a time and a location specified by a user.

(6) The terminal device according to any of (1) to (5), in which the prediction unit includes a function of predicting a movement route of the terminal device and a function of predicting a location and an arrival time of at least one point on the movement route, and predicts the local information in relation to the predicted location and arrival time.

(7) The terminal device according to any of (1) to (6), further including a sensor which acquires predetermined data, in which the local information is the data acquired by the sensor.

(8) The terminal device according to any of (1) to (7), in which the local information is evaluation information in relation to a predetermined index which is evaluated and input by a user that has the terminal device.

(9) A terminal control method including causing a terminal device to acquire local information of a present location at a present time; causing a terminal device to accumulate the acquired local information for a predetermined period; causing a terminal device to transmit the local information, which is accumulated for a predetermined period to an information processing device, and to receive parameters of a statistical model which are learned using the local information which is acquired using the information processing device from a plurality of terminal devices, from the information processing device; and causing a terminal device to predict the local information in relation to an arbitrary time and location using the received parameters of the statistical model.

(10) A program causing a computer to function as an acquisition unit which acquires local information of a present location at a present time; an accumulation unit which accumulates the acquired local information for a predetermined period; a communication unit which transmits the local information which is accumulated for a predetermined period to an information processing device, and receives parameters of a statistical model which are learned using the local information, which is acquired using the information processing device from a plurality of terminal devices, from the information processing device; and a prediction unit which predicts the local information in relation to an arbitrary time and location using the received parameters of the statistical model.

(11) An information processing system formed from a terminal device and an information processing device in which the terminal device includes an acquisition unit which acquires local information of a present location at a present time; an accumulation unit which accumulates the acquired local information for a predetermined period; and a communication unit which transmits the local information which is accumulated for a predetermined period to the information processing device, and receives parameters of a statistical model which are learned using the local information, which is acquired using the information processing device from a plurality of terminal devices, from the information processing device, and in which the information processing device includes a communication unit which receives the local information for a predetermined period transmitted thereto from the terminal device, and transmits the parameters of the statistical model to the terminal device; and a learning unit which learns the parameters of the statistical model using the local information received from a plurality of terminal devices, and in which either one of the terminal device or the information processing device includes a prediction unit which predicts the local information in relation to an arbitrary time and location using the parameters of the statistical model.

The present disclosure contains subject matter related to that disclosed in Japanese Priority Patent Application JP 2012-079034 filed in the Japan Patent Office on Mar. 30, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A portable terminal comprising:
   at least one processor and a storage device configured to function as:
   an acquisition unit which acquires local information of a present location at a present time, wherein the local information is information representing a congestion factor of a base station to which the portable terminal is connected in order to perform communication;
   an accumulation unit which accumulates the acquired local information at the present position for a period of time;
   a communication unit which:
     transmits, to an information processing device, the local information at the present position which is accumulated for the period of time, and
     receives, from the information processing device, parameters of a statistical model which are learned using local information from a plurality of other portable terminals at other locations different from the present location, wherein the statistical model is a regression model in which at least a time and an area are explanatory variables, and items of local information are criterion variables; and
   a prediction unit which predicts local information representing the congestion factor of a base station for a specified time and location using the received parameters of the statistical model, which predicts a movement route of the portable terminal, which predicts a location and an arrival time of the portable terminal at a point on the movement route and which predicts the local information representing the congestion factor of a base station in relation to the predicted location and the predicted arrival time, wherein the received parameters of the statistical model are learned using the local information acquired from the plurality of other portable terminals.

2. The portable terminal according to claim 1, wherein, the communication unit receives only the parameters in which the weighting parameter is not zero, of weighting parameters of the regression model.

3. The portable terminal according to claim 1, wherein the prediction unit predicts the local information in relation to a time and a location specified by a user.

4. The portable terminal according to claim 1, further comprising:
   a sensor which acquires data, wherein the local information comprises the data acquired by the sensor.

5. The portable terminal according to claim 1, wherein the local information comprises evaluation information evaluated and input by a user of the portable terminal.

6. A portable terminal control method comprising:
   causing a portable terminal to acquire local information of a present location at a present time, wherein the local information is information representing a congestion factor of a base station to which the portable terminal is connected in order to perform communication;
   causing the portable terminal to accumulate the acquired local information at the present position for a period of time;
   causing the portable terminal to:
     transmit, to an information processing device, the local information at the present position, which is accumulated for the period of time, and receive, from the information processing device, parameters of a statistical model which are learned using local information acquired from a plurality of other portable terminals at other locations different from the present location, wherein the statistical model is a regression model in which at least a time and an area are explanatory variables, and items of local information are criterion variables; and
   causing the portable terminal to predict local information representing the congestion factor of a base station for a specified time and location using the received parameters of the statistical model, to predict a movement route of the portable terminal, to predict a location and an arrival time of the portable terminal at a point on the movement route and to predict the local information representing the congestion factor of a base station in relation to the predicted location and the predicted arrival time, wherein the received parameters of the statistical model are learned using the local information acquired from the plurality of other portable terminals.

7. A non-transitory computer storage device comprising instructions, which, when executed, cause at least one processor of a computer to function as:
   an acquisition unit which acquires local information of a present location at a present time, wherein the local information is information representing a congestion factor of a base station to which the portable terminal is connected in order to perform communication;

an accumulation unit which accumulates the acquired local information at the present position for a period of time;

a communication unit which:
- transmits, to an information processing device, the local information at the present position which is accumulated for the period of time, and
- receives, from the information processing device, parameters of a statistical model which are learned using local information from a plurality of other portable terminals at other locations different from the present location, wherein the statistical model is a regression model in which at least a time and an area are explanatory variables, and items of local information are criterion variables; and a prediction unit which predicts local information representing the congestion factor of a base station for a specified time and location using the received parameters of the statistical model, which predicts a movement route of the portable terminal, which predicts a location and an arrival time of the portable terminal at a point on the movement route and which predicts the local information representing the congestion factor of a base station in relation to the predicted location and the predicted arrival time, wherein the received parameters of the statistical model are learned using the local information acquired from the plurality of other portable terminals.

8. An information processing system formed from a portable terminal and an information processing device, wherein:

the portable terminal includes:
at least one processor and a storage device configured to function as:
- an acquisition unit which acquires local information of a present location at a present time, wherein the local information is information representing a congestion factor of a base station to which the portable terminal is connected in order to perform communication;
- an accumulation unit which accumulates the acquired local information at the present position for a period of time; and
- a communication unit which:
  - transmits, to the information processing device, the local information at the present position which is accumulated for the period of time, and
  - receives, from the information processing device, parameters of a statistical model which are learned using local information acquired from a plurality of other portable terminals at other locations different from the present location, wherein the statistical model is a regression model in which at least a time and an area are explanatory variables, and items of local information are criterion variables; and the information processing device includes:
- a communication unit which receives the local information at the present location accumulated for the period of time transmitted thereto from the portable terminal, and transmits the parameters of the statistical model to the portable terminal; and
- a learning unit which learns the parameters of the statistical model using the local information received from the plurality of other portable terminals; and wherein either one of the portable terminal or the information processing device includes a prediction unit which predicts the local information representing the congestion factor of a base station for a specified time and location using the parameters of the statistical model, which predicts a movement route of the portable terminal, which predicts a location and an arrival time of the portable terminal at a point on the movement route and which predicts the local information representing the congestion factor of a base station in relation to the predicted location and the predicted arrival time, wherein the received parameters of the statistical model are learned using the local information acquired from the plurality of other portable terminals.

* * * * *